United States Patent
Roy et al.

(10) Patent No.: US 10,445,219 B1
(45) Date of Patent: Oct. 15, 2019

(54) EXTRACTING TRANSACTION LEVEL INFORMATION FROM A CIRCUIT INTERFACE

(71) Applicant: Xilinx, Inc., San Jose, CA (US)

(72) Inventors: Niloy Roy, Hyderabad (IN); Jake Chang, San Jose, CA (US); Bradley K. Fross, Boulder, CO (US)

(73) Assignee: XILINX, INC., San Jose, CA (US)

( * ) Notice: Subject to any disclaimer, the term of this patent is extended or adjusted under 35 U.S.C. 154(b) by 75 days.

(21) Appl. No.: 15/839,735

(22) Filed: Dec. 12, 2017

(51) Int. Cl.
   *G06F 11/36* (2006.01)
   *G06F 11/34* (2006.01)

(52) U.S. Cl.
   CPC ........ *G06F 11/3656* (2013.01); *G06F 11/348* (2013.01); *G06F 11/3476* (2013.01)

(58) Field of Classification Search
   CPC .... G06F 11/004; G06F 11/0751; G06F 11/30; G06F 2201/87
   USPC ........................................................ 714/47.1
   See application file for complete search history.

(56) References Cited

U.S. PATENT DOCUMENTS

| | | | |
|---|---|---|---|
| 6,384,627 B1 | 5/2002 | Fross et al. | |
| 6,732,348 B1 | 5/2004 | Tahoori et al. | |
| 6,760,898 B1 | 7/2004 | Sanchez et al. | |
| 7,085,706 B1 | 8/2006 | McGettigan et al. | |
| 8,332,697 B1 | 12/2012 | Peattie | |
| 8,874,801 B1 | 10/2014 | Ramineni et al. | |
| 9,083,347 B1 | 7/2015 | Remla et al. | |
| 9,581,643 B1 | 2/2017 | Schelle et al. | |
| 2007/0055915 A1* | 3/2007 | Kobylinski | G06F 11/004 714/47.1 |
| 2009/0064149 A1* | 3/2009 | Singh | G06F 11/263 718/101 |
| 2015/0032752 A1* | 1/2015 | Greifeneder | H04L 41/142 707/738 |
| 2019/0050278 A1* | 2/2019 | Bangad | G06F 11/004 |

OTHER PUBLICATIONS

Xilinx, Integrated Logic Analyzer v6.2: LogiCORE IP Product Guide, Vivado Design Suite, PG172 (Oct. 5, 2016).

* cited by examiner

*Primary Examiner* — Sarai E Butler
(74) *Attorney, Agent, or Firm* — Kevin T. Cuenot

(57) ABSTRACT

Extracting transaction level information from an interface can include tracking transactions of an interface within an integrated circuit (IC) using a plurality of counters within the IC, wherein the counters generate counter data corresponding to the transactions. The method can include capturing signals of the interface as trace data for a trace window using an integrated logic analyzer within the IC, wherein a start of the trace window begins after a start of the tracking of the transactions using the plurality of counters. The method can also include using a host data processing system coupled to the IC, determining transaction level information for the interface using the counter data and the trace data for the trace window.

20 Claims, 11 Drawing Sheets

EXTRACTING TRANSACTION LEVEL INFORMATION FROM A CIRCUIT INTERFACE

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to integrated circuits and, more particularly, to extracting transaction level information from an interface within an integrated circuit using, at least in part, integrated logic analysis circuitry.

BACKGROUND

A logic analyzer is an electronic device that is capable of capturing and displaying signals of a digital system or digital circuit for purposes of debugging and/or verification. In the case of some programmable integrated circuits (ICs), the logic analyzer is included within the IC itself. The logic analyzer and a user circuit design, for example, are implemented within the IC using programmable circuitry. The logic analyzer is referred to as an "integrated logic analyzer" (ILA) since the logic analyzer is integrated with the user circuit design and implemented in the same IC as the user circuit design for purposes of debugging and/or verification.

SUMMARY

One or more embodiments are directed to methods for extracting transaction level information from an interface. In one aspect, a method can include tracking transactions of an interface within an IC using a plurality of counters within the IC, wherein the counters generate counter data corresponding to the transactions. The method can include capturing signals of the interface as trace data for a trace window using an integrated logic analyzer within the IC, wherein a start of the trace window begins after a start of the tracking of the transactions using the plurality of counters. The method can also include using a host data processing system coupled to the IC, determining transaction level information for the interface using the counter data and the trace data for the trace window.

One or more embodiments are directed to systems for extracting transaction level information from an interface within an IC. The system can include an interface tracking circuit implemented within the IC. The interface tracking circuit can include a memory configured to store counter values indicating outstanding transactions of the interface, a mapper circuit configured to read and write counter values to addresses in the memory based upon transaction identifiers of the transactions, and a counter circuit configured to increment or decrement the counter values retrieved from the memory by the mapper circuit in response to detected starts and ends of the transactions. The system can also include an integrated logic analyzer configured to store signal data from the interface for the transactions as trace data and store the counter values, wherein the trace data is for a trace window having a start occurring subsequent to a start of operation of the interface tracking circuit.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION OF THE DRAWINGS

Figure 1:
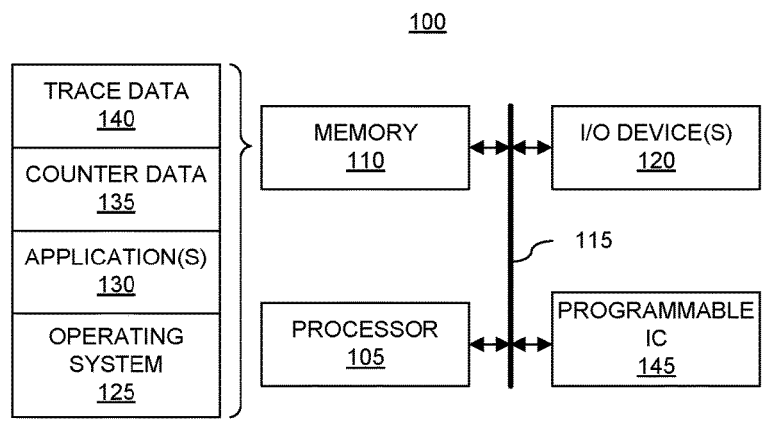
FIG. 1 illustrates an example of a host data processing system for use with one or more embodiments described herein.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to extracting transaction level information for an interface within an IC. Interface monitoring circuitry is implemented within the IC in combination with a user circuit design. The interface monitoring circuitry is capable of collecting and/or generating different types of information relating to operation of the interface.

In one or more embodiments, the interface monitoring circuitry is capable of generating counter data. The counter data tracks the starts of transactions and the ends of transactions occurring over the interface over time during operation of the user circuit design. The interface monitoring circuitry is also capable of collecting and/or generating trace data. The trace data generally includes the values of signals of the interface over time during operation of the user circuit design. The trace data may be collected for a defined or limited period of time referred to as a "trace window".

In general, the interface monitoring circuitry is capable of generating counter data prior to the start of the trace window. In particular embodiments, the counters are capable of starting operation with the start of operation of the IC and/or the interface being monitored within the IC. The counters are capable of continuing operation until at least the start of the trace window and/or continue operation beyond the start of the trace window. The counter data provides state information for the interface for times leading up to and/or including the start of the trace window. Using the counter data, the state of the interface can be determined at the start of the trace window without having to store large amounts of information.

The counter data and the trace data can be provided from the interface monitoring circuitry to a host data processing system (e.g., a "host system") for analysis. The host system is capable of using the counter data to determine information such as the number of outstanding transactions on the interface at any given time during operation of the interface so long as the counters are operational for that time. An outstanding transaction is a transaction that has started (e.g., a start of the transaction has been detected), but that has not yet completed (e.g., an end of the transaction has not been detected). Using the counter data, the host system is capable of matching ends of the transactions occurring within the trace window with corresponding starts of the transactions.

As an illustrative and non-limiting example, the host system is able to determine whether a given end of a transaction within the trace window corresponds to a start of a transaction based, at least in part, upon the number of outstanding transactions at the start of the trace window. Without storing the counter data, the matching of starts of transactions to corresponding ends of transactions would require storing trace data for the interface going back in time to the start of operation of the IC and/or interface itself. Storing such a large amount of data requires significant on-chip memory resources which are impractical to implement and may not be available within the IC.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example of a host data processing system (host system) 100 for use with one or more embodiments described herein. In one or more embodiments, host system 100 is implemented as a computer, device, or other system that is suitable for storing and executing program code.

Host system 100 includes at least one processor 105. Processor 105 is coupled to memory 110 through interface circuitry 115. System 100 stores computer readable instructions (also referred to as "program code") within memory 110. Memory 110 is an example of computer readable storage media. Processor 105 executes the program code accessed from memory 110 via interface circuitry 115.

Memory 110 includes one or more physical memory devices such as, for example, a local memory and a bulk storage device. Local memory refers to non-persistent memory device(s) generally used during actual execution of program code. Examples of local memory include random access memory (RAM) and/or any of the various types of RAM that are suitable for use by a processor during execution of program code (e.g., dynamic RAM or "DRAM", synchronous DRAM or "SDRAM", and double data rate RAM or "DDR RAM"). A bulk storage device refers to a persistent data storage device. Examples of bulk storage devices include, but are not limited to, a hard disk drive (HDD), a solid-state drive (SSD), flash memory, a read-only memory (ROM), an erasable programmable read-only memory (EPROM), electrically erasable programmable read-only memory (EEPROM), or other suitable memory. System 100 may also include one or more cache memories (not shown) that provide temporary storage of at least some program code in order to reduce the number of times program code must be retrieved from a bulk storage device during execution.

Memory 110 is capable of storing program code. The program code may include routines, programs, objects, components, logic, data structures, and so on. For purposes of illustration, memory 110 stores an operating system 125 and one or more application(s) 130. In the example of FIG. 1, memory 110 further stores counter data 135 and trace data 140. Counter data 135 and trace data 140 are obtained from monitor circuitry implemented within programmable IC 145.

In one or more embodiments, application(s) 130 include an EDA application. The EDA application is capable of performing a design flow (e.g., synthesis, placement, routing, and/or bitstream generation) on a circuit design. For example, the EDA application is capable of including interface monitoring circuitry as described herein with a user circuit design through a design flow and implementing the resulting circuit design within programmable IC 145. In one or more embodiments, application(s) 130 include an interface analysis application capable of performing the various operations described herein relating to the receipt and/or analysis of counter data 135 and/or trace data 140.

In an aspect, operating system 125 and application(s) 130, being implemented in the form of executable program code, are executed by host system 100 and, more particularly, by processor 105, to perform the operations described within this disclosure. As such, operating system 125 and application(s) 130 may be considered an integrated part of host system 100. Further, it should be appreciated that any data used, generated, and/or operated upon by host system 100 (e.g., processor 105) are functional data structures that impart functionality when employed as part of the system.

Examples of interface circuitry 115 include, but are not limited to, an input/output (I/O) subsystem, an I/O interface, a bus system, and a memory interface. For example, interface circuitry 115 may be one or more of any of several types of bus structures, including a memory bus or memory controller, a peripheral bus, an accelerated graphics port, and a processor or local bus using any of a variety of bus architectures. Examples of bus architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Host system 100 further may include one or more input/output (I/O) devices 120 coupled to interface circuitry 115. I/O devices 120 may be coupled to host system 100, e.g., interface circuitry 115, either directly or through intervening I/O controllers. Examples of I/O devices 120 include, but are not limited to, a keyboard, a display device, a pointing device, one or more communication ports, a network adapter, etc. A network adapter refers to circuitry that enables host system 100 to become coupled to other systems, computer systems, remote printers, and/or remote storage devices through intervening private or public networks. Modems, cable modems, Ethernet cards, and wireless transceivers are examples of different types of network adapters that may be used with host system 100.

In the example of FIG. 1, host system 100 includes, or is coupled to, programmable IC 145. Programmable IC 145 may be coupled to host system 100 as a peripheral device. In the example of FIG. 1, programmable IC 145 is coupled to interface circuitry 115. In one or more embodiments, programmable IC 145 is implemented as a field programmable gate array (FPGA). As such, programmable IC 145 may include array of programmable tiles (e.g., circuit blocks). These programmable tiles may include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect circuitry and programmable logic circuitry. The programmable interconnect circuitry typically includes a large number of interconnect lines of varying lengths interconnected by programmable interconnect points (PIPs). The programmable logic circuitry implements the logic of a user design using programmable elements that may include, for example, function generators, registers, arithmetic logic, and so forth.

Programmable IC 145 is capable of implementing a user circuit design in combination with interface monitoring circuitry. The interface monitoring circuitry is integrated into the user circuit design within programmable IC 145. The interface monitoring circuitry is capable of tracking the operation of various components of the user circuit design such as, for example, an interface. During operation of the user circuit design within programmable IC 145, the interface monitoring circuitry is capable of generating counter data 135 and trace data 140. At least initially, counter data 135 and trace data 140 are stored within internal memory within programmable IC 145. In the example of FIG. 1, programmable IC 145 provides counter data 135 and trace data 140 to host system 100, e.g., to processor 105, for storage in memory 110 and subsequent analysis.

Host system 100 may include fewer components than shown or additional components not illustrated in FIG. 1 depending upon the particular type of device and/or system that is implemented. In addition, the particular operating system and/or application(s) included may vary according to device and/or system type as may the types of I/O devices included. Further, one or more of the illustrative components may be incorporated into, or otherwise form a portion of, another component. For example, a processor may include at least some memory.

Figure 2:
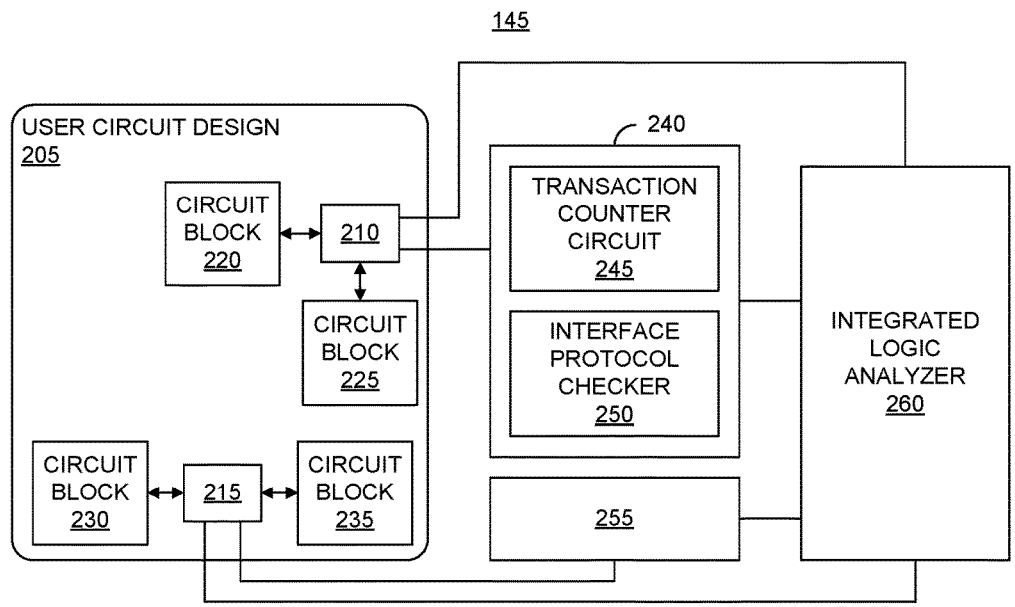
FIG. 2 illustrates an example of a user circuit design and integrated interface monitoring circuitry.

FIG. 2 illustrates an example of a user circuit design and integrated interface monitoring circuitry. In the example of FIG. 2, a user circuit design 205 is implemented within programmable IC 145. For example, user circuit design 205 may be implemented using, at least in part, programmable circuitry of programmable IC 145. User circuit design 205 includes a first interface 210 and a second interface 215.

In one or more embodiments, interface 210 and interface 215 are implemented as on-chip interconnects. An example of an on-chip interconnect is an Advanced Microcontroller Bus Architecture (AMBA) eXtensible Interface (AXI) bus. An AMBA AXI bus (or "AXI interconnect") is an embedded microcontroller bus interface for use in establishing on-chip connections between circuit blocks and/or systems. An AXI interconnect is provided as an example of an interface and is not intended as a limitation of the embodiments described within this disclosure. Other examples of interfaces that may be used to implement interface 210 and interface 215 include, but are not limited to, other types of buses, a network-on-chip (NoC), a cross-bar, or other type of switch.

In one or more embodiments, interfaces 210 and 215 support communication concurrency. The term "communication concurrency" refers to a quality of an interface, e.g., a bus, that supports transaction pipelining and out-of-order transactions. These two features of communication concurrency facilitate higher bus performance by preventing read and/or write channels from interfering with one another and by avoiding stalls within the read and/or write channels. As an illustrative and non-limiting example, in a split transaction bus type of interface, a read (write) transaction can be initiated followed by a write (read) transaction regardless of whether the read (write) transaction has completed.

Interface 210 couples circuit block 220 with circuit block 225. For example, circuit block 220 (e.g., the master circuit) may be configured to generate or output data that is provided via interface 210 to circuit block 225 (e.g., the slave circuit). Interface 215 couples circuit block 230 with circuit block 235. Circuit block 230 (e.g., the master circuit) may be configured to generate or output data that is provided via interface 215 to circuit block 235 (e.g., the slave circuit).

In the example of FIG. 2, the interface monitoring circuitry includes interface tracking circuits 240 and 255 and integrated logic analyzer (ILA) 260. Interface tracking circuits 240 and 255 are implemented within programmable IC 145 and integrated with user circuit design 205. Interface tracking circuit 240 is coupled to interface 210. Interface tracking circuit 255 is coupled to interface 215. Interface tracking circuit 240 includes a transaction detection circuit 245 and optionally an interface protocol checker 250. Interface tracking circuit 255 can be configured the same as, or similar to, interface tracking circuit 240.

Interface tracking circuits 240 and 255 are also coupled to ILA 260. ILA 260 is coupled directly to one or more signals of interfaces 210 and/or 215. ILA 260 is capable of detecting a trigger event from one or more probed signals and, in response to the detected trigger event, store values of the probed signals or other signals of user circuit design 205 within a memory located within ILA 260. Whereas interface tracking circuits 240 and 255 generate counter data, ILA 260 stores actual values of signals of interface 210, interface 215, and/or other signals of user circuit design 205.

In the example of FIG. 2, interface tracking circuits 240 and 255 and ILA 260 are incorporated into user circuit design 205. For example, using an EDA tool, cores corresponding to interface tracking circuits 240 and 255 and ILA 260 are added into user circuit design 205. The EDA tool is capable of performing synthesis, placement, routing, and/or configuration bitstream generation where the configuration bitstream that is loaded into programmable IC 145 specifies user circuit design 205, interface tracking circuits 240, 255, ILA 260 and the connectivity illustrated in FIG. 2 among the circuit blocks shown.

Figure 3:
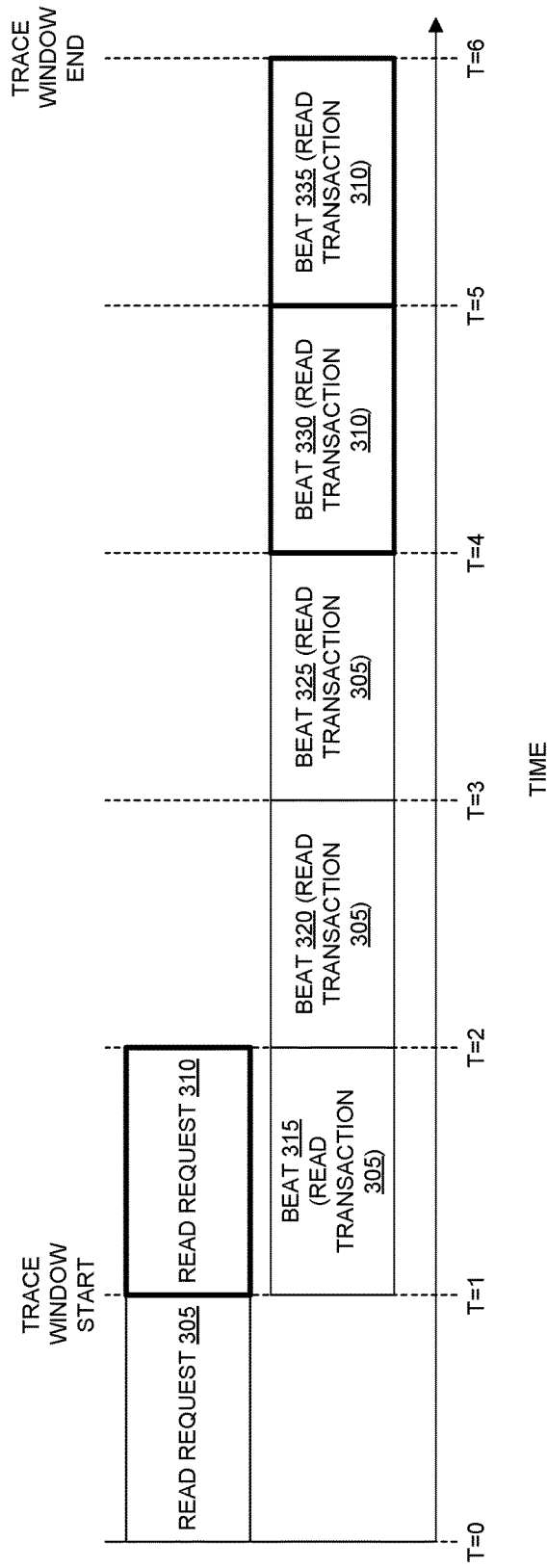
FIG. 3 illustrates example transactions occurring over an interface.

FIG. 3 illustrates example transactions occurring over an interface. FIG. 3 illustrates a scenario where two read requests 305 and 310 are initiated on an interface such as interface 210 of FIG. 2. In the example of FIG. 3, read request 305 and read request 310 each represents the start of a transaction. For purposes of illustration, transactions are referred to using the same reference number as the request that initiates or starts the transaction. For example, read request 305 represents the start of a read transaction 305. Read request 310 represents the start of a read transaction 310.

Read request 305 occurs at time T=0. Read transaction 305 includes beats 315, 320, and 325. Each of beats 315, 320, and 325 represents data returned in response to read request 305. Beats 315, 320, and 325 of read transaction 305 occur at times T=1, T=2, and T=3 respectively. Beat 315 is the first beat of read transaction 305 and beat 325 is the last beat of read transaction 305. Beats 330 and 335 of read transaction 310 occur at times T=4 and T=5, respectively. Beat 330 is the first beat of read transaction 310 and beat 335 is the last beat of read transaction 310. Portions of read transaction 310 are illustrated using bold outline for purposes of illustration.

In the example of FIG. 3, a trace window starts at time T=1 and ends at time T=6. For example, an ILA is capable of storing values of probed signals starting at time T=1 and ending at time T=6. In conventional logic analyzer systems, when a trace is started after an interface has already started operation and transactions have been initiated, there is no way to correlate the beats of the transaction, in this case the data returned as a result of the initiated read transactions, with the correct read request. As an illustrative and non-limiting example, without actively monitoring the entire time that the interface is operating, a logic analyzer system may incorrectly attribute beats 315, 320, and 325 or beats 320 and 325 to read request 310.

In accordance with the inventive arrangements described herein, the interface tracking circuit is capable of counting the starts of transactions and the ends of transactions for the entire time that the interface is operational within the IC. By using counters to track starts and ends of transactions, a count of outstanding transactions can be determined at the start of the trace window. The counts may be maintained independently for read transactions and for write transactions. Referring to the example of FIG. 3, knowing that there is one outstanding transaction on the interface (e.g., read transaction 305), a host system is able to determine that beats 315, 320, and 325, though occurring within the trace window, are not part of read transaction 310. The host system is capable of excluding particular responses, e.g., in this case beats 315, 320 and 325, from consideration during the matching. Thus, the host system is able to determine that beats 315, 320, and 325 match a read request (e.g., a transaction start) that occurred prior to the start of the trace window and should not be matched to a start of a transaction occurring during the trace window. The system is able to disregard beats 315, 320, and 325 for purposes of matching to a start of a transaction and correctly match beats 330 and 335 to read request 310.

Figure 4:
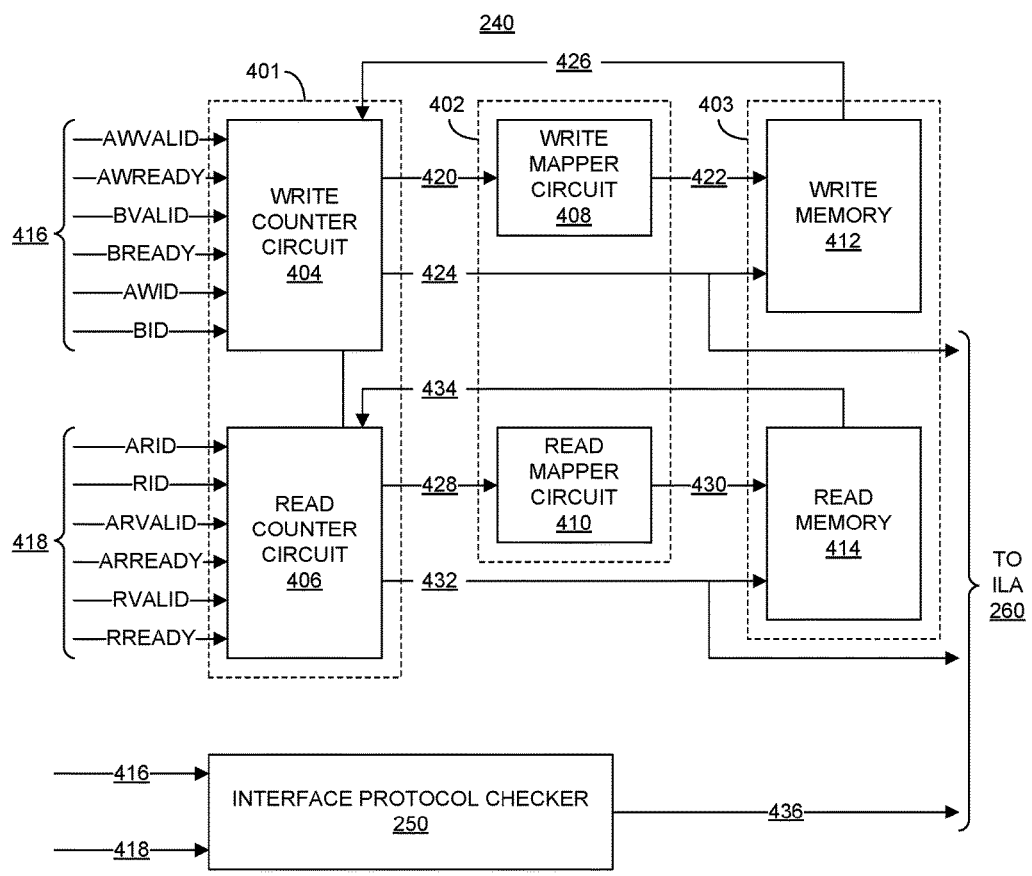
FIG. 4 illustrates an example implementation of an interface tracking circuit.

FIG. 4 illustrates an example implementation of interface tracking circuit 240 described in connection with FIG. 2. In the example of FIG. 4, interface tracking circuit 240 can include a counter circuit 401, a mapper circuit 402, and a memory 403. Counter circuit 401 is capable of generating counter data specifying a number of outstanding transactions at any given time. Counter circuit 401, for example, is capable of incrementing a counter in response to detecting a start of a transaction and decrementing the counter in response to detecting an end of a transaction. Mapper circuit 402 is capable of controlling the storage and retrieval of counter values, which are stored in memory 403.

In the example of FIG. 4, write circuit 401 includes a write counter circuit 404 and a read counter circuit 406. Mapper circuit 402 includes a write mapper circuit 408 and a read mapper circuit 410. Memory 403 includes a write memory 412, and a read memory 414.

In general, interface tracking circuit 240 implements a plurality of counters capable of tracking read transactions and write transactions. Write counter circuit 404, write mapper circuit 408, and write memory 412, taken collectively, implement a plurality of write counters capable of tracking write transactions. Read counter circuit 406, read mapper circuit 410, and read memory 414, taken collectively, implement a plurality of read counters capable of tracking read transactions.

In one or more embodiments, write counter circuit 404 includes an add circuit and a subtract circuit. In particular embodiments, write counter circuit 404 includes comparators for evaluating the state of each of control signals 416. Write counter circuit 404 is capable of evaluating the state of control signals 416 and invoking either the add circuit or the subtract circuit to adjust a counter value retrieved from write memory 412 based upon the detected state of control signals 416. Write counter circuit 404 is capable of invoking the add circuit to increment the counter value by one in response to detecting a state on control signals 416 corresponding to a write request. Write counter circuit 404 is capable of invoking the subtract circuit to decrement the counter value by one in response to detecting a state on control signals 416 corresponding to an end of a write transaction.

For example, in response to detecting a handshake between the AWVALID signal and the AWREADY signal for a selected transaction identifier (ID) specified by the AWID signal, write counter circuit 404 increments a counter value for a counter that corresponds to, or is allocated to, the selected transaction ID. A handshake between the AWVALID and AWREADY signals signifies a write request having the transaction ID specified by the AWID signal. A write request is the beginning of a write transaction.

The AWVALID or "write address valid" signal indicates that the write channel of the interface is signaling a valid write address and control information. The AWREADY or "write address ready" signal indicates that the slave circuit is ready to accept an address and the associated control signals. The AWID or "write address ID" signal specifies the transaction ID for the AWVALID and AWREADY signals.

In particular embodiments, the transaction ID specified by the AWID signal is forwarded to write mapper circuit 408 via signal 420. Write mapper circuit 408 is capable of determining an address in write memory 412 that is associated with the received transaction ID. The address in write memory 412 is the location of the counter value allocated to the transaction ID. Within this disclosure, the term "counter" may be used interchangeably with the term "counter value" and/or the address that specifies the memory location that stores the counter value. Accordingly, in response to receiving the transaction ID, write mapper circuit 408 is capable of controlling write memory 412 via signal 422. Write mapper circuit 408, for example, provides a read enable signal and the address associated with the received transaction ID to write memory 412, thereby causing write memory 412 to output the counter value located at the specified address to write counter circuit 404 via signal 426.

Write counter circuit 404, in response to receiving the counter value from write memory 412, increments the counter value using the adder circuit. Write counter circuit 404 is capable of outputting the incremented counter value via signal 424 to write memory 412. Write counter circuit 404 further outputs the transaction ID to write mapper circuit 408. Write mapper circuit 408 is capable of controlling write memory 412 to write the incremented counter value back to the address from which the counter value was initially read.

In response to detecting a handshake between the BVALID signal and the BREADY signal for a selected transaction ID specified by the BID signal, write counter circuit 404 decrements a counter value for a counter that corresponds to, or is allocated to, the selected transaction ID. A handshake between the BVALID and the BREADY signals signifies the end or completion of a write transaction with the transaction ID specified by the BID signal.

The BVALID or "write response valid" signal indicates that a valid write response has occurred. The BREADY or "response ready" signal indicates that the master circuit can accept a write response. The BID or "response ID tag" signal indicates the transaction ID for the BVALID and BREADY signals.

In particular embodiments, the transaction ID specified by the BID signal is forwarded to write mapper circuit 408 via signal 420. Write mapper circuit 408 is capable of determining an address in write memory 412 that is associated with the received transaction ID. The address in write memory 412 is the location of the counter value, e.g., the counter, allocated to the transaction ID. Accordingly, in response to receiving the transaction ID, write mapper circuit 408 is capable of controlling write memory 412 via signal 422. Write mapper circuit 408, for example, provides a read enable signal and the address associated with the received transaction ID to write memory 412, thereby causing write memory 412 to output the counter value located at the specified address to write counter circuit 404 via signal 426.

Write counter circuit 404, in response to receiving the counter value from write memory 412, decrements the counter value using the subtract circuit. Write counter circuit 404 is capable of outputting the decremented counter value via signal 424 to write memory 412. Write counter circuit 404 further outputs the transaction ID to write mapper circuit 408. Write mapper circuit 408 is capable of controlling write memory 412 to write the decremented counter value back to the address from which the counter value was initially read.

In one or more embodiments, read counter circuit 406 includes an add circuit and a subtract circuit. In particular embodiments, read counter circuit 406 includes comparators for evaluating the state of each of control signals 418. Read counter circuit 406 is capable of evaluating the state of control signals 418 and invoking either the add circuit or the subtract circuit to adjust a counter value retrieved from read memory 414 based upon the detected state of control signals 418. Read counter circuit 406 is capable of invoking the add circuit to increment the counter value by one in response to detecting a state on control signals 418 corresponding to a read request. Read counter circuit 406 is capable of invoking the subtract circuit to decrement the counter value by one in response to detecting a state on control signals 418 corresponding to an end of a read transaction.

For example, in response to detecting a handshake between the ARVALID signal and the ARREADY signal for a selected transaction ID specified by the ARID signal, read counter circuit 406 increments a counter value for a counter that corresponds to, or is allocated to, the selected transaction ID. A handshake between the ARVALID and ARREADY signals signifies a read request having the transaction ID specified by the ARID signal. A read request is the beginning of a read transaction.

The ARVALID or "read address valid" signal indicates that the read channel of the interface is signaling a valid read address and control information. The ARREADY or "read address ready" signal indicates that the slave circuit is ready to accept an address and the associated control signals. The ARID or "read address ID" signal specifies the transaction ID for the ARVALID and ARREADY signals.

In particular embodiments, the transaction ID specified by the ARID signal is forwarded to read mapper circuit 410 via signal 428. Read mapper circuit 410 is capable of determining an address in read memory 414 that is allocated to the received transaction ID. The address in read memory 414 is the location of the counter value, e.g., the counter, allocated to the transaction ID. Accordingly, in response to receiving the transaction ID, read mapper circuit 410 is capable of controlling read memory 414 via signal 430. Read mapper circuit 410, for example, provides a read enable signal and the address associated with the received transaction ID to read memory 414, thereby causing read memory 414 to output the counter value located at the specified address to read counter circuit 406 via signal 434.

Read counter circuit 406, in response to receiving the counter value from read memory 414, increments the counter value using the add circuit. Read counter circuit 406 is capable of outputting the incremented counter value via signal 432 to read memory 414. Read counter circuit 406 further outputs the transaction ID to read mapper circuit 410. Read mapper circuit 410 is capable of controlling read memory 414 to write the incremented counter value back to the same address from which the counter value was initially read.

In response to detecting a handshake between the RVALID signal and the RREADY signal for a selected transaction ID specified by the RID signal, read counter circuit 406 decrements a counter value for a counter that corresponds to, or is allocated to, the selected transaction ID. A handshake between the RVALID and the RREADY signals signifies the end or completion of a read transaction with the transaction ID specified by the RID signal.

The RVALID or "read valid" signal indicates that the read channel of the interface is signaling the required read data. The RREADY or "read ready" signal indicates that the master circuit can accept the read data and response information. The RID or "read ID tag" signal indicates the transaction ID for the RVALID and RREADY signals.

In particular embodiments, the transaction ID specified by the RID signal is forwarded to read mapper circuit 410 via signal 428. Read mapper circuit 410 is capable of determining an address in read memory 414 that is associated with the received transaction ID. The address in read memory 414 is the location of the counter value, e.g., the counter, allocated to the transaction ID. Accordingly, in response to receiving the transaction ID, read mapper circuit 410 is capable of controlling read memory 414 via signal 430. Read mapper circuit 410, for example, provides a read enable signal and the address associated with the received transaction ID to read memory 414, thereby causing read memory 414 to output the counter value located at the specified address to read counter circuit 406 via signal 434.

Read counter circuit 406, in response to receiving the counter value from read memory 414, decrements the counter value using the subtract circuit. Read counter circuit 406 is capable of outputting the decremented counter value via signal 432 to read memory 414. Read counter circuit 406 further outputs the transaction ID to read mapper circuit 410. Read mapper circuit 410 is capable of controlling read memory 414 to write the decremented counter value back to the address from which the counter value was initially read.

In one or more embodiments, write memory 412 and read memory 414 are implemented as addressable RAMs. Write memory 412 and read memory 414, for example, may be implemented as distributed addressable RAMs. An example of a distributed and addressable RAM is a lookup-table-based RAM (LUT-based RAM) as may be implemented within some programmable ICs as described herein in connection with FIG. 11.

As illustrated in FIG. 4, write memory 412 and read memory 414 are addressable using a transaction ID. In particular embodiments, write mapper circuit 408 and read mapper circuit 410 are capable of generating addresses for counter values (e.g., counters) for a number of unique transaction IDs specified by the MAX_RD_BURST or MAX_WR_BURST as the case may be as specified within the user circuit design. Further, the width of the data in each of memories 412 and 414 is dependent on the maximum number of outstanding transactions configured for the interface in the user circuit design.

As an illustrative and non-limiting example, the maximum number of transactions for an AXI interface may be 32. In other examples, the maximum number of transactions may be more than 32. In the case of a maximum of 32, 5 bits are needed to keep a count of outstanding transactions. Error conditions can be accommodated by adding an extra bit to the 5 bits. For example, to detect whether a counter has exceeded the allowable limit of outstanding transactions, an extra bit may be added to the counters and used as an "overflow" bit indicating an overflow or error condition. Accordingly, in the example described, each counter value stored in write memory 412 and read memory 414 is a 6-bit value.

In one or more embodiments, write mapper circuit 408 is capable of controlling the allocation of counters to count particular write transactions. Write mapper circuit 408, for example, is capable of allocating particular addresses of write memory 412 to particular transaction IDs. Once an address is allocated to a particular transaction ID, the address in write memory 412 is used to store the counter value allocated to the transaction ID. The address, once allocated, is designated by write mapper circuit 408 as "allocated" and is unavailable for allocation to another transaction ID until first marked as "available". Write mapper circuit 408 is capable of detecting when an address stores a counter value that has been decremented to zero and, in response, de-allocating that address. The de-allocated address is marked as "available" and, as such, may then be allocated to track a different transaction ID. In this manner, write mapper circuit 408 is capable of allocating and de-allocating counters by controlling the allocation and de-allocation of addresses in write memory 412 to particular transaction IDs.

For example, in response to detecting a write transaction having a transaction ID of 2 for which no write counter has been allocated, write mapper circuit 408 is capable of allocating an available one of the write counters (e.g., an available address for storing a counter value in write memory 412) to tracking write transactions with the transaction ID of 2. Having assigned the available write counter to tracking write transactions with a transaction ID of 2, write mapper circuit 408 designates the write counter (e.g., the address of write memory 412) as "allocated". Subsequently, in response to determining that the allocated write counter is no longer being used, e.g., the counter value stored in the address is decremented to 0, write mapper circuit 408 is capable of designating the write counter as "available" thereby allowing the write counter to be allocated for tracking other write transactions.

Similarly, read mapper circuit 410 is capable of controlling the allocation of counters to count particular read transactions. Read mapper circuit 410, for example, is capable of allocating particular addresses of read memory 414 to particular transaction IDs. Once an address is allocated to a particular transaction ID, the address in read memory 414 is used to store the counter value allocated to the transaction ID. The address, once allocated, is designated by read mapper circuit 410 as "allocated". Read mapper circuit 410 is capable of detecting when an address stores a counter value that has been decremented to zero and, in response, de-allocating that address. The de-allocated address is marked as "available" and may then be allocated to track a different transaction ID. In this manner, read mapper circuit 410 is capable of allocating and de-allocating counters by controlling the allocation and de-allocation of addresses in read memory 414 to particular transaction IDs.

For example, in response to detecting a read transaction having a transaction ID of 1 for which no read counter has been allocated, read mapper circuit 410 is capable of assigning an available one of the read counters (e.g., an available address for storing a counter value in read memory 414) to tracking read transactions with the transaction ID of 1. Having assigned the available read counter to tracking read transactions with a transaction ID of 1, read mapper circuit 410 designates the read counter (e.g., the address of read memory 414) as "allocated". In response to determining that the allocated read counter is no longer being used, e.g., the counter value stored at the address is decremented to 0, read mapper circuit 410 is capable of designating the read counter as "available" thereby allowing the read counter to be allocated for tracking other read transactions.

In one or more embodiments, write counter circuit 404 is capable of outputting the processed counter value via signal 424 to ILA 260. Similarly, read counter circuit 406 is capable of outputting the processed counter value via signal 432 to ILA 260. Though not illustrated in FIG. 4, ILA 260 further is capable of receiving other signals of the interface being monitored as trace data. As such, ILA 260 is capable of receiving the trace data and counter data from interface tracking circuit 240.

Interface protocol checker 250 is capable of checking for violations in the protocol utilized by the particular interface being monitored. Further, interface protocol checker is capable of outputting, via signal 436, the particular type of violation that is detected. As an illustrative and non-limiting example, interface protocol checker 250 may be implemented as an AXI protocol checker. In one or more embodiments, interface protocol checker 250 may be implemented as a core that implements synthesizable versions of protocol assertions (e.g., as specified in System Verilog or another HDL) available from the provider of the particular interface being monitored and coupled to interface protocol checker 250.

Figure 5:
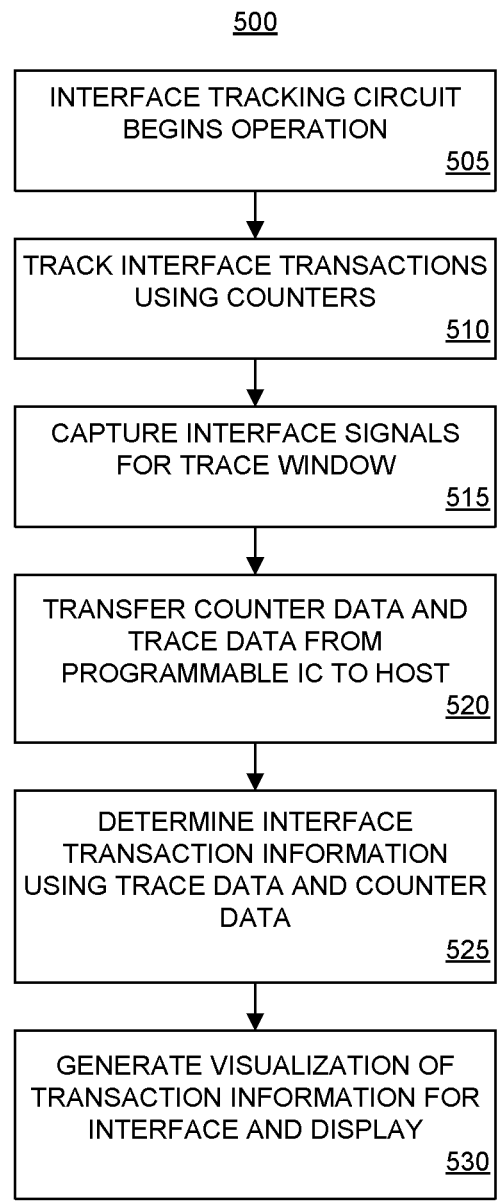
FIG. 5 illustrates an example method of extracting transactions occurring over an interface.

FIG. 5 illustrates an example method 500 of extracting transactions occurring over an interface. Method 500 may be performed using an architecture the same as or similar to that described in connection with FIGS. 1, 2, and 4. Method 500 may begin in a state where an interface tracking circuit and an ILA have been incorporated into a user circuit design that has been implemented within a programmable IC. Further, the programmable IC is in communication with a host system.

In block 505, the interface tracking circuit begins operation. In one or more embodiments, the interface tracking circuit begins operation as the programmable IC and the interface being monitored begin to operate. For example, the interface tracking circuit is capable of starting operation in response to boot-up of the programmable IC and implementation of the circuit design therein. As such, the interface tracking circuit is capable of tracking transactions occurring over the interface from the beginning or start of operation of the interface.

In block 510, the interface tracking circuit tracks transactions occurring over the interface using counters. Operation of the interface tracking circuit is described in connection with FIG. 4 where counters are allocated to tracking read and write transactions occurring over the interface. The counters are incremented responsive to read (write) requests and decremented in response to detecting an end of a read (write) transaction. Additional operational details relating to the interface tracking circuit are described in connection with FIG. 6.

In block 515, the ILA captures interface signals for a trace window. The trace window, as illustrated in FIG. 3, may begin at a time after the start of operation of the programmable IC and the interface being monitored. As discussed in connection with FIG. 4, the ILA is capable of receiving counter data from the interface tracking circuit. The counter data provided from the interface tracking circuit to the ILA may be synchronized with the interface signals provided to the ILA. As such, the ILA is capable of storing the interface signals as trace data for the trace window and the counter data. The ILA is capable of storing the trace data synchronized in time with the counter data. As such, the counter data for any point in time may be recalled including, for example, for any time occurring within the trace window. It should be appreciated that the ILA is also capable of storing any protocol violation data output from the protocol checker synchronized in time with the counter data.

In block 520, the ILA is capable of transferring the counter data and the trace data from the programmable IC to the host system. In block 525, the host system is capable of determining interface transaction information using the trace data and the counter data. For example, the host system is capable of matching transaction starts with transaction ends based, at least in part, upon the number of outstanding transactions indicated by the counter data at the start of the trace window.

In block 530, the host system is capable of generating a visualization of the transaction information for the interface and displaying the visualization. In one or more embodiments, the host system is capable of displaying a graphical representation of the transaction information. Each transaction, for example, may be displayed on a timeline as a waveform or a block.

Figure 6:
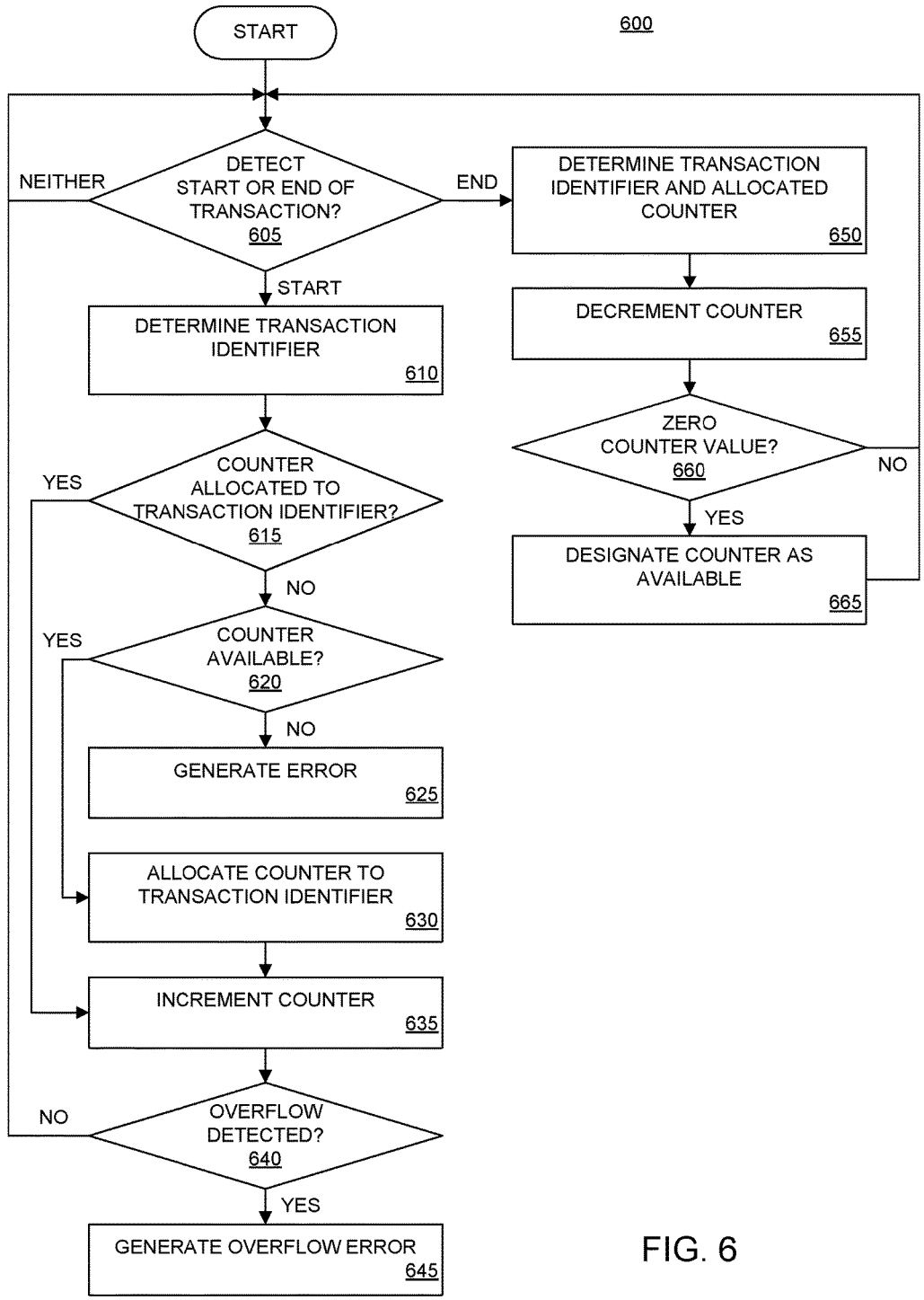
FIG. 6 illustrates an example method of operation for an interface tracking circuit.

FIG. 6 illustrates an example method 600 of operation for an interface tracking circuit. Method 600 illustrates an example method of allocating and de-allocating counters for transactions. Method 600 illustrates the general case of allocating or de-allocating counters whether for read transactions or write transactions. Accordingly, method 600 may be performed using an interface tracking circuit the same as or similar to that described in connection with FIGS. 2 and 4. Method 600 may begin in a state where the interface tracking circuit and an ILA have been incorporated into a user circuit design that has been implemented within a programmable IC.

In block 605, the interface tracking circuit determines whether the start or end of a transaction is detected. As noted, the type of transaction may be a read transaction or a write transaction. If an end of a transaction is detected, method 600 continues to block 650. If a start of a transaction is detected, method 600 continues to block 610. If neither a start nor an end of a transaction is detected, method 600 loops back to continue checking for a start or an end of a transaction.

Continuing with block 610, the interface tracking circuit determines the transaction identifier for the detected transaction. For example, the write (read) mapper circuit receives a signal specifying the transaction ID. In block 615, the interface tracking circuit determines whether a counter has been assigned to the transaction ID. For example, the write (read) mapper circuit is capable of determining whether the transaction ID is assigned to an address in the appropriate memory. If a counter is allocated to the transaction ID, method 600 continues to block 635. If a counter is not allocated to the transaction ID, method 600 continues to block 620.

In block 620, the interface tracking circuit determines whether a counter is available. For example, the write (read) mapper circuit is capable of determining whether a counter (address) within the relevant memory is available to be allocated to the transaction ID. If a counter is available, method 600 continues to block 630. If a counter is not available, method 600 continues to block 625.

In block 625, the interface tracking circuit generates an error. In one or more embodiments, the write (read) mapper circuit is capable of informing the write (read) counter circuit that no further counters are available. In response, the write (read) counter circuit is capable of outputting a count value in which all of the bits are asserted. For example, in the case where the counter values are stored as 4-bit values with an additional overflow bit, the write (read) counter circuit outputs a counter value of "11111" indicating that the number of outstanding write (read) transactions on the interface has exceeded a limit.

In one or more embodiments, the number of write (read) counters included in the interface tracking circuit is limited. As an illustrative and non-limiting example, the interface tracking circuit may include upon to 16 read counters and up to 16 write counters.

In block 630, the interface tracking circuit assigns a counter to the transaction ID. For example, the write (read) mapper circuit is capable of allocating an available write (read) counter to the transaction ID. Accordingly, the allocated write (read) counter is designated as "allocated". In block 635, the interface tracking circuit increments the count value of the write (read) counter allocated to the transaction ID.

In block 640, the interface tracking circuit determines whether an overflow error is detected. An overflow error occurs when the counter value of the allocated counter incremented in block 635 overflows. If an overflow condition is detected, method 600 continues to block 645. If an overflow condition is not detected, method 600 loops back to block 605 to continue processing.

In one or more embodiments, an overflow condition is indicated by setting each of the bits of the allocated counter value to 0 except for the overflow bit. For example, in the case where the counter values are stored as 4-bit values with an additional overflow bit, the write (read) counter circuitry is capable of setting the counter value of the allocated counter to a value of "10000", which indicates that the number of outstanding transactions for the transaction ID corresponding to the allocated counter has exceeded a limit.

Continuing with block 650, in the case where an end of a write (read) transaction is detected, the interface tracking circuit is capable of determining the transaction ID and the write (read) counter allocated to the transaction ID. For example, the write (read) mapper circuit is capable of determining the address of the write (read) counter. In block 655, the interface tracking circuit is capable of decrementing the write (read) counter determined in block 650.

In block 660, the interface tracking circuit determines whether the counter value of the allocated counter decremented in block 655 is now 0. If the counter value of the counter decremented in block 655 is 0, the write (read) mapper circuit is capable of designating the allocated counter as "available". If the counter value of the allocated counter is not 0, method 600 can loop back to block 605 to continue processing.

In one or more embodiments, the interface tracking circuit is capable of detecting a start of a transaction and an end of a transaction concurrently, where the start and end are for the same transaction ID. In such cases, the interface tracking circuit is capable of leaving the counter allocated to the transaction ID untouched. For example, since the interface tracking circuit would recall the counter value only to increment and then decrement the counter value leaving it unchanged, the interface tracking circuit is capable of skipping the processing otherwise performed for a detected start of a transaction and skipping the processing otherwise performed for a detected end of the transaction. In cases where a start of a transaction and an end of a transaction are detected concurrently for a same transaction ID where a counter is not allocated to the transaction ID, the interface tracking circuit can skip the allocation of a counter to the transaction ID and skip the processing that would otherwise be performed.

Figure 7:
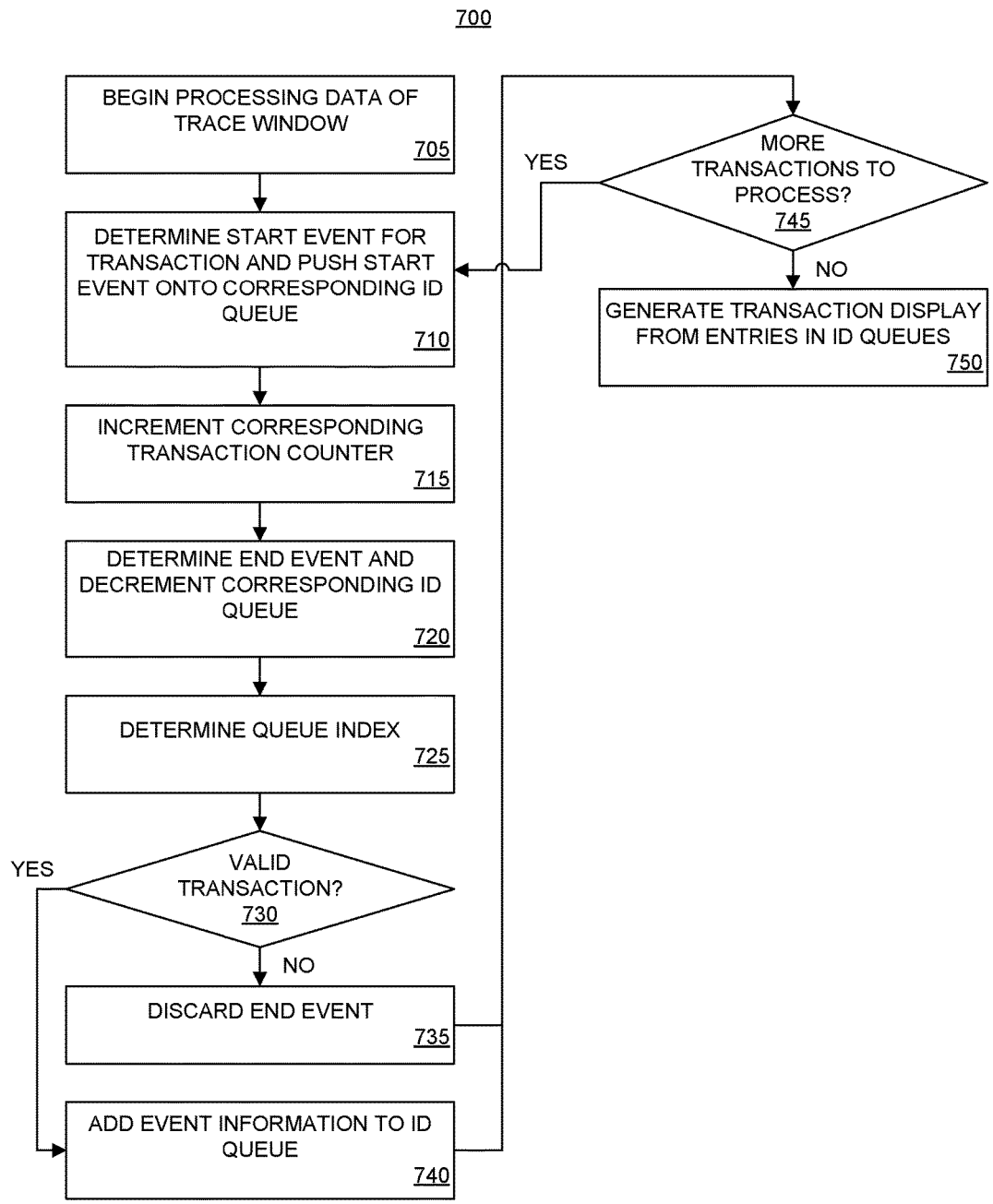
FIG. 7 illustrates an example method of determining interface transaction information.

FIG. 7 illustrates an example method 700 of determining interface transaction information. Method 700 may be performed by a host as described herein in connection with FIG. 1. In one or more embodiments, the host is capable of receiving trace data and counter data from the programmable IC as described. The host is capable of operating on the received data. For example, method 700 may be performed by the host to implement block 525 and/or block 530 of FIG. 5.

In particular embodiments, the host operates on the data as received, e.g., in real time or in substantially real time. In other embodiments, the host is capable of operating on the received data as a post processing task, e.g., subsequent to receiving the data. In still another embodiment, the host is capable of operating on the data as received and generating a waveform view of the transactions as a post-processing task. The trace data and the counter data is timestamped so that counter values occurring in the counter data can be correlated, in time, with the trace data.

In general, in processing the trace data and the counter data, the host is capable of setting up two queues per transaction ID. The queues are referred to generally as ID queues. For each transaction ID, the host maintains a read queue and a write queue. For example, with transaction IDs of 0 and 1, the host uses a read queue and a write queue for transaction ID 0 and a read queue and a write queue for transaction ID 1 (e.g., four ID queues). Each read ID queue is used to track events for read transactions for a particular transaction ID. Each write ID queue is used to track events for write transactions of a particular transaction ID.

The host is also capable of maintaining a transaction counter for each ID queue. Since each ID queue is dedicated for read events or write events, each transaction counter is also dedicated for tracking read events or for tracking write events as the case may be (e.g., depending upon the particular ID queue each counter is associated with). The transaction counters maintained by the host are distinct from the counters implemented within the programmable IC. For purposes of description, the transaction counters maintained in the host are referred to as "host transaction counters".

In block 705, the host begins processing the data for a trace window. For example, the data received by the host, e.g., the trace data and the counter data, is for a limited amount of time corresponding to a trace window. A trace window refers to the time span during operation of the IC for which trace data is collected and stored. The counter data may be generated throughout operation of the IC as described and may not be constrained by the start and/or end of the trace window. The trace data and counter data, for example, may be timestamped using a same reference (e.g., ILA 260) so that the host can correlate the counter data with the trace data for any given time within the trace window.

In one or more embodiments, as part of block 705, when processing read transactions, the host initializes the read transaction counters. When processing write transactions, the host initializes the write transaction counters. While method 700 is described with reference to transactions in general, method 700 may be implemented to process write transactions, read transactions, or both.

In processing the received data, the host is capable of processing the data in chronological order. For example, the host is capable of starting at the beginning of the data, searching for starts of transactions and ends of transactions that occur in chronological order within the received data to match starts and ends of same transactions.

In block 710, the host determines a start event for the transaction and pushes the start event onto a corresponding ID queue. In the case of write transaction processing, the host detects a start event for a write transaction. The start event for a write transaction may be a write address command for an AWID signal. In block 710, for example, the host pushes the start event for the write transaction on the ID queue for tracking write transactions for the transaction ID of the start event.

In the case of read transaction processing, the host detects a start event for a read transaction. The start event for a read transaction may be the read address command for an ARID signal. In block 710, for example, the host pushes the start event for the read transaction on the ID queue for tracking read transactions for the transaction ID of the start event.

In block 715, the host increments a corresponding host transaction counter. For example, the host increments the host transaction counter associated with the particular ID queue into which the start event identified in block 710 is pushed.

In block 720, the host identifies an end event for the transaction and decrements the corresponding host transaction counter. For example, in the case of write transaction processing, the host detects an end event for the write transaction. The end event for a write transaction may be a write response for the BID signal. The end event may or may not be for the same write transaction initially identified in block 710. In block 720, the host decrements the appropriate host transaction counter based upon the transaction ID for the detected end event and the transaction type (e.g., write in this example).

In the case of read transaction processing, the host detects an end event for the read transaction. The end event for a read transaction may be the last data beat for the BID signal. The end event may or may not be for the same read transaction initially identified in block 710. In block 720, the host decrements the appropriate host transaction counter based upon the transaction ID for the detected end event and the transaction type (e.g., read in this example).

In block 725, the host determines a queue index. The queue index is a measure, calculated by the host, used in determining whether a given end event matches one or more start events forming a valid transaction. The host is capable of subtracting the counter value for a given transaction ID and transaction type, at the time of the detected end event within the trace data, from the host transaction counter. In general, the host subtracts the count of outstanding transactions obtained from the programmable IC from the internally maintained host transaction counter (given same transaction IDs and same transaction types), where the counter value from the programmable IC is for the same time as the internally maintained host transaction counter. The result is referred to as the queue index and is used in determining validity of transactions as described in greater detail below.

In block 730, the host determines whether the end event detected in block 720 is for a valid transaction. A valid transaction is one where the queue index calculated in block 725 for the end event detected in block 720 is positive and one in which the end event detected in block 720 matches an entry in the corresponding ID queue (the ID queue determined based upon the transaction ID and the transaction type). In response to determining that the transaction is valid, method 700 continues to block 740. In response to determining that the transaction is not valid, method 700 continues to block 735.

In block 735, the host discards the end event identified in block 725. The host discards the end event based upon determining that the transaction is invalid. In other words, the host determines that the detected end event does not correspond to any start event occurring during the trace window (e.g., does not match any start event stored within an ID queue). After block 735, method 700 continues to block 745.

In block 740, the host adds the end event to the appropriate ID queue. For example, the host stores the end event information within the ID queue with the start event. As such, the ID queue includes both the start event and the end event for the transaction. After block 735, method 700 continues to block 745.

In block 745, the host determines whether there are more transactions in the received data to process. If so, method 700 loops back to block 710 to continue processing. If not, method 700 continues to block 750. In block 750, the host is capable of generating a transaction display or view from entries in the ID queues.

Figure 8:
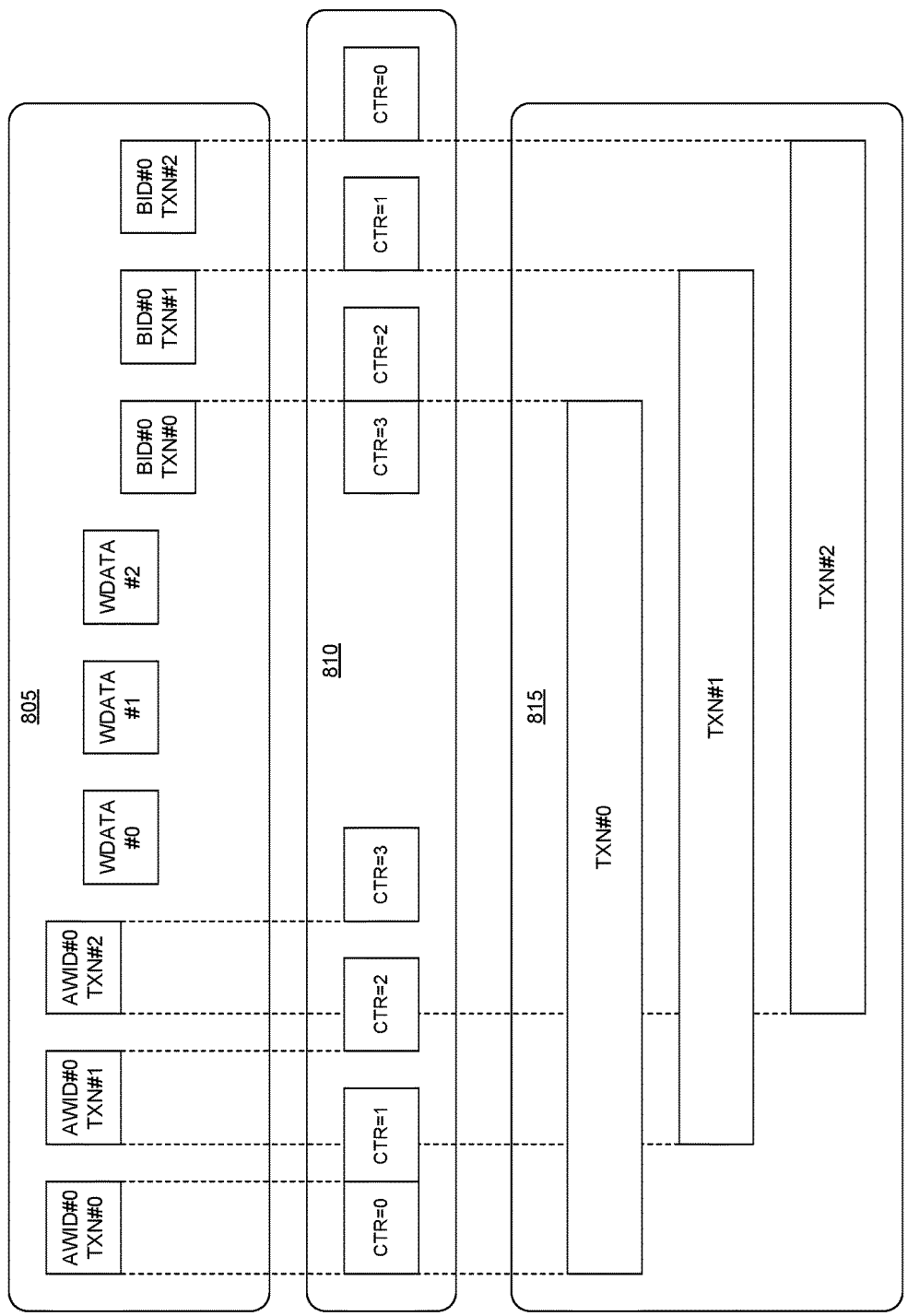
FIG. 8 illustrates an example of extracting transaction level information for write transactions occurring over an interface.

FIG. 8 illustrates an example of extracting transaction level information for write transactions occurring over an interface. FIG. 8 illustrates an example where a master circuit is driving write transactions that each have the same transaction ID. In the case where each transaction has the same transaction ID, the order of execution of write transactions is to be the same as the order in which the write transactions are issued (e.g., the same as the order of the write requests). In cases where no transaction ID is used, such transactions are treated as all having a same transaction ID. An example interface that uses same (or no) transaction IDs is an AXI4LITE type of AXI interface.

Region 805 illustrates detected signal states occurring on the interface with time increasing from left to right. Region 810 illustrates the state of write counters in time alignment with the signal states detected and shown in region 805. Region 815 is an example of a user interface that can be presented by the host system showing transaction information determined by the host system based upon trace data and counter data received from the ILA in the programmable IC. In region 815, the transactions are shown as time aligned waveforms or blocks.

Referring to region 805, each block labeled "AWID#0" indicates the occurrence and detection of an AWVALID-AWREADY signal handshake corresponding to the start of a write transaction. In the example of FIG. 8, three write transactions are detected. Since there is no transaction ID in this example, one write counter is used to track the outstanding write transactions on the interface.

Region 810 illustrates how the counter (CTR) is incremented and decremented in response to the various states detected from the control signals. As pictured, the counter value is initially 0. In the clock cycle following "AWID#0 TXN#0", the counter is incremented by one to a value of 1. In the clock cycle following "AWID#0 TXN#1", the counter is incremented by one to a value of 2. In the clock cycle following "AWID#0 TXN#2", the counter is incremented by one to a value of 3.

Referring again to region 805, each block labeled "BID#0" indicates the occurrence and detection of a BVALID-BREADY signal handshake corresponding to the end of a write transaction. Referring to region 810, the counter is decremented in response to each "BID#0" block. In the clock cycle following "BID#0 TXN#0", the counter is decremented by one to a value of 2. In the clock cycle following "BID#0 TXN#1", the counter is decremented by one to a value of 1. In the clock cycle following "BID#0 TXN#2", the counter is decremented by one to a value of 0. Upon the counter reaching a value of 0, the counter is de-allocated and marked as "available".

The interface tracking circuit is capable of outputting the counter values on a per clock cycle basis to the ILA. The interface tracking circuit is capable of outputting the counter values in synchronization with the signal data received by the ILA from the interface. The ILA is capable of storing the counter values over time, including for times prior to the start of a trace window, throughout the trace window, and continuing beyond the trace window.

Referring to region 815, the host system is capable of correlating the signals of the trace data received from the ILA with the counter data also received from the ILA. In one or more embodiments, the host system is capable of matching the write address commands and write responses, for example, with corresponding counter values (in time) to determine the beginning and end of particular write transactions.

In the example of FIG. 8, the host system generates a visualization of the transaction data in which a waveform view or a block is shown for each of transactions TXN#0, TXN#1, and TXN#2 on a timeline where the start of each write transaction is determined based upon the AWID#0 signal handshakes and the end of each write transaction is determined based upon the BID#0 signal handshakes. In one or more embodiments, the timeline corresponds to the start and end time of the trace window.

In cases where the trace window of the ILA does not start until the time between TXN#0 and TXN#1, by knowing that one outstanding transaction exists at the start of the trace window, host system is capable of correctly correlating "BID#0 TXN#0" to "AWID#0 TXN#0" instead of "AWID#0 TXN#1". Otherwise, the host system would incorrectly match "BID#0 TXN#0" to "AWID#0 TXN#1". For example, this condition would be determined by the host based upon the calculated queue index and other validity measures described in connection with FIG. 7.

Figure 9:
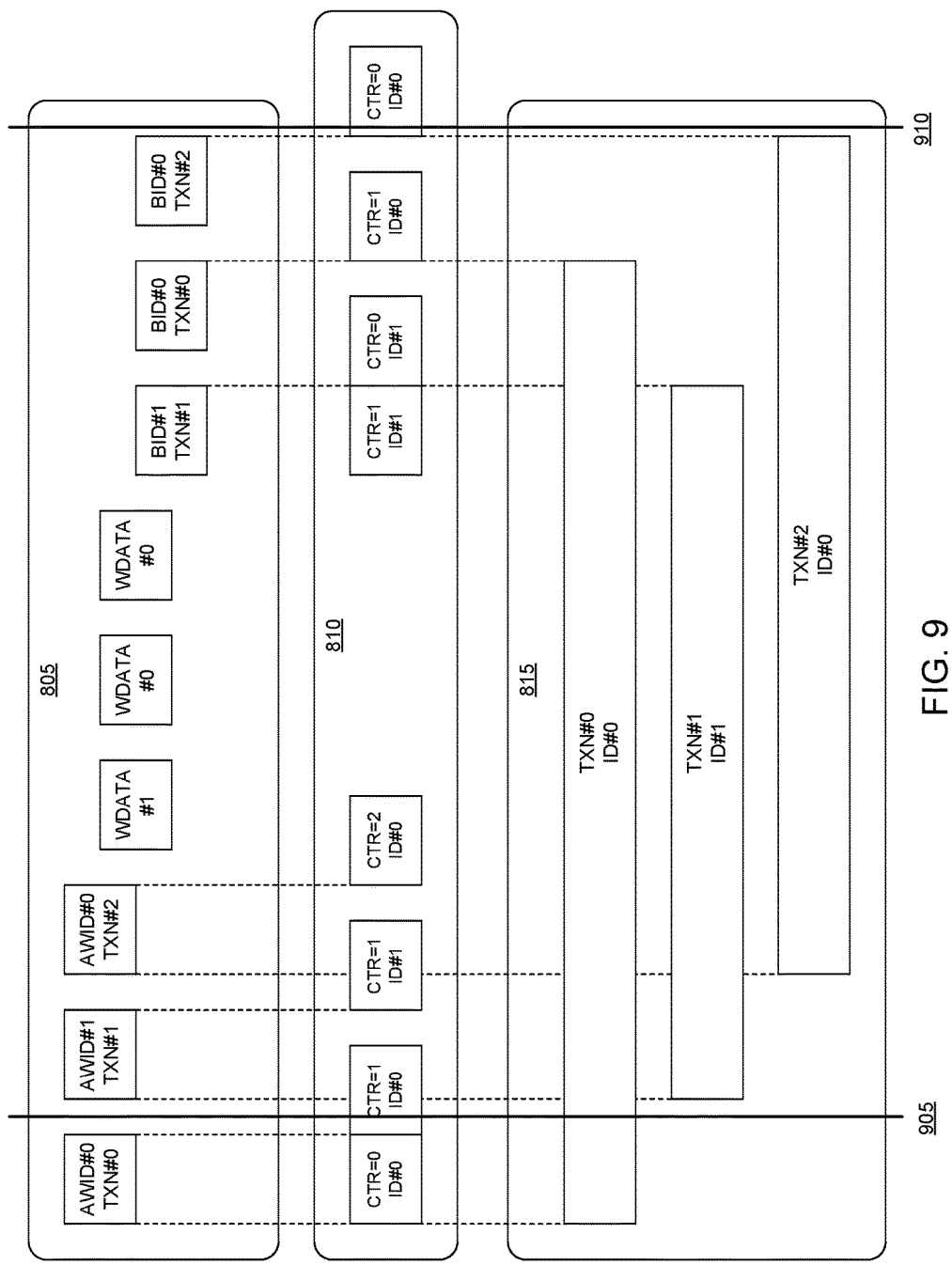
FIG. 9 illustrates another example of extracting transaction level information for write transactions occurring over an interface.

FIG. 9 illustrates another example of extracting transaction level information for write transactions occurring over an interface. FIG. 9 illustrates an example of generating counter data in the case of write transactions that have different transaction IDs. In the case where transactions have different transaction IDs, the transactions can complete in any order. As such, transactions may complete in a different order than issued.

Referring to region 805, each block labeled "AWID" indicates the occurrence and detection of an AWVALID-AWREADY signal handshake corresponding to the start of a write transaction. The transaction ID is specified following the "#" sign for each AWVALID-AWREADY signal handshake. In the example of FIG. 9, three write transactions are detected with transaction IDs 0 (for TXN#0), followed by 1 (for TXN#1), followed by 0 (for TXN#2). In this example, two write counters are used since there are two different transaction IDs used.

Region 810 illustrates how the two counters are incremented and decremented in response to the various states detected from the control signals. As pictured, the counter for transaction ID 0 (ID#0) and the counter for transaction ID 1 (ID#1) are both initially 0. In the clock cycle following "AWID#0 TXN#0", the counter for transaction ID 0 is incremented by one to a value of 1. In the clock cycle following "AWID#1 TXN#1", the counter for transaction ID 1 is incremented by one to a value of 1. In the clock cycle following "AWID#0 TXN#2", the counter for transaction ID 0 is incremented by one to a value of 2.

Referring again to region 805, each block labeled "BID" indicates the occurrence and detection of a BVALID-BREADY signal handshake corresponding to the end of a write transaction. Referring to region 810, the appropriate counter is decremented in response to each "BID" block. In the clock cycle following "BID#1 TXN#1", the counter for transaction ID 1 is decremented by one to a value of 0. In the clock cycle following "BID#0 TXN#0", the counter for transaction ID 0 is decremented by one to a value of 1. In the clock cycle following "BID#0 TXN#2", the counter for transaction ID 0 is decremented by one to a value of 0. Upon each counter reaching a value of 0, the counters are de-allocated and marked as "available".

The interface tracking circuit is capable of outputting the counter values on a per clock cycle basis to the ILA. The interface tracking circuit is capable of outputting the counter values in synchronization with the signal data received by the ILA from the interface. The ILA is capable of storing the counter values over time, including for times prior to the start of a trace window, throughout the trace window, and continuing beyond the trace window.

In the example of FIG. 9, the host system generates a visualization of the transaction data in which a waveform view or a block is shown for each of transactions TXN#0, TXN#1, and TXN#2 on a timeline where the start of each transaction is determined based upon the AWID signal handshakes and the end of each transaction is determined from the BID signal handshakes described.

In the example of FIG. 9, line 905 marks the start of the trace window. Line 910 marks the end of the trace window. In processing the trace data and counter data, the host is capable of first initializing the write transaction counters to zero. In response to detecting the "AWID#1 TXN#1" start event, for example, the host pushes the detected start event onto the write ID queue for ID=1 at index 0. The host further increments the host (write) transaction counter for ID=1 to 1.

The host next detects the "AWID#0 TXN#2" start event. In response to detecting the "AWID#0 TXN#2" start event, the host pushes the start event onto the write ID queue for ID=0 at index 0. Further, the host increments the host (write) transaction counter for ID=0 to 1.

Next the host is capable of detecting the "BID#1 TXN#1" end event. The host finds the corresponding write ID queue for ID=1 and performs the following operations for determining whether the end event is for a valid transaction. The host calculates the query index. In this example, the query index is the value of the host (write) transaction counter for ID=1 minus the value of the hardware counter (CTR) from the programmable IC at the same time within the trace data for the same ID. In this example, the host (write) transaction counter for ID=1 is 1 and the counter value (CTR) for ID=1 is also 1. Accordingly, the queue index is 0. Since the queue index is non-negative, the queue index is valid. Further, the host is capable of determining that the end event does match an entry (e.g., start event) within the write ID queue for ID=1. Because the end event is for a valid write transaction, the host adds the end event information for the "BID#1 TXN#1" end event to the entry of the matching start event in the write ID queue for ID=1 at index 0.

Next the host is capable of detecting the "BID#0 TXN#1" end event. The host finds the corresponding write ID queue for ID=0 and performs the following operations for determining whether the end event is for a valid transaction. The host calculates the query index. In this example, the query index is the value of the host (write) transaction counter for ID=0 minus the value of the hardware counter (CTR) from the programmable IC at the same time within the trace data for the same ID. In this example, the host (write) transaction counter for ID=0 is 1 and the counter value (CTR) for ID=0 is 2. Accordingly, the queue index is −1. Since the queue index is negative, the queue index is invalid. Further, the host is capable of determining that the end event does not match an entry (e.g., start event) within the write ID queue for ID=0. Because the end event is not for a valid write transaction, the host discards the end event as corresponding to a start event that occurred prior to the start of the trace window.

Next the host is capable of detecting the "BID#0 TXN#2" end event. The host finds the corresponding write ID queue for ID=0 and performs the following operations for determining whether the end event is for a valid transaction. The host calculates the query index. In this example, the query index is the value of the host (write) transaction counter for ID=0 minus the value of the hardware counter (CTR) from the programmable IC at the same time within the trace data for the same ID. In this example, the host (write) transaction counter for ID=0 is 1 and the counter value (CTR) for ID=0 is 1. Accordingly, the queue index is 0. Since the queue index is non-negative, the queue index is valid. Further, the host is capable of determining that the end event does match an entry (e.g., start event) within the write ID queue for ID=0. Because the end event is for a valid write transaction, the host adds the end event to the queue entry (corresponding to the matching start event) at index 0.

In response to finishing processing of the transactions, the host is capable of generating the view illustrated in region 815.

Figure 10:
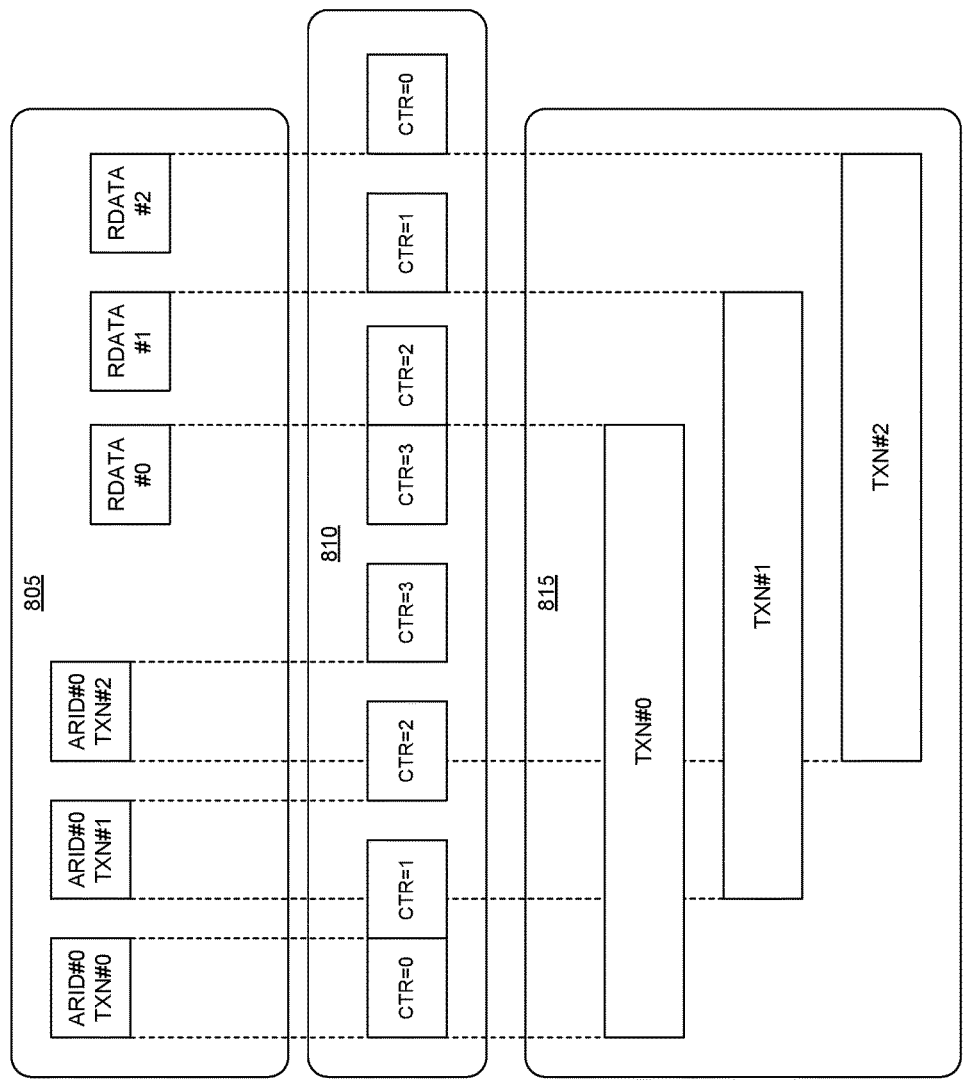
FIG. 10 illustrates an example of extracting transaction level information for read transactions occurring over an interface.

FIG. 10 illustrates an example of extracting transaction level information for read transactions occurring over an interface. FIG. 10 illustrates an example where a master circuit is driving read transactions that each have the same transaction ID. In the case where each transaction has the same transaction ID, the order of execution of read transactions is to be the same as the order in which the read transactions are issued (e.g., the same as the order of the read requests). An example interface that uses the same transaction IDs is an AXI4LITE type of AXI interface.

Referring to region 805, each block labeled "ARID#0" indicates the occurrence and detection of an ARVALID-ARREADY signal handshake corresponding to the start of a read transaction. In the example of FIG. 10, three read transactions are detected. Since there is no transaction ID in this example, one read counter is used to track the outstanding read transactions on the interface.

Region 810 illustrates how the counter is incremented and decremented in response to the various states detected from the control signals. As pictured, the counter value is initially 0. In the clock cycle following "ARID#0 TXN#0", the counter is incremented by one to a value of 1. In the clock cycle following "ARID#0 TXN#1", the counter is incremented by one to a value of 2. In the clock cycle following "ARID#0 TXN#2", the counter is incremented by one to a value of 3.

Referring again to region 805, each block labeled "RDATA#0" indicates the occurrence and detection of an RVALID-RREADY signal handshake corresponding to the end of a read transaction. Referring to region 810, the counter is decremented in response to each "RDATA#0" block. In the clock cycle following "RDATA#0", the counter is decremented by one to a value of 2. In the clock cycle following "RDATA#1", the counter is decremented by one to a value of 1. In the clock cycle following "RDATA#2", the counter is decremented by one to a value of 0. Upon the counter reaching a value of 0, the counter is de-allocated and marked as "available".

The interface tracking circuit is capable of outputting the counter values on a per clock cycle basis to the ILA. The interface tracking circuit is capable of outputting the counter values in synchronization with the signal data received by the ILA from the interface. The ILA is capable of storing the counter values over time, including for times prior to the start of a trace window, throughout the trace window, and continuing beyond the trace window.

Referring to region 815, the host system is capable of correlating the signals of the trace data received from the ILA with the counter data also received from the ILA. The host system is capable of matching the read address commands and read data beats (e.g., responses), for example, with corresponding counter values (in time) to determine the beginning and end of particular read transactions.

In the example of FIG. 10, the host system generates a visualization of the transaction data in which a waveform view or a block is shown for each of transactions TXN#0, TXN#1, and TXN#2 on a timeline where the start of each transaction is determined based upon the ARID#0 signal handshakes and the end of each transaction is determined from the RDATA signal handshakes. In one or more embodiments, the timeline corresponds to the start and end time of the trace window.

The counter data allows the host system to distinguish between transaction events that occur within a trace window, but that match a transaction event occurring outside of the trace window. For example, in cases where the trace window of the ILA does not start until the time between TXN#0 and TXN#1, by knowing that one outstanding transaction exists at the start of the trace window from the counter data, the host system is capable of correctly correlating "RDATA#0" to "ARID#0 TXN#0" instead of "ARID#0 TXN#1". Otherwise, the host system would incorrectly match "RDATA#0" to "ARID#0 TXN#1". For example, the host is capable of determining the queue index and other validity measures described in connection with FIG. 7 for matching end events to correct start events of transactions.

Figure 11:
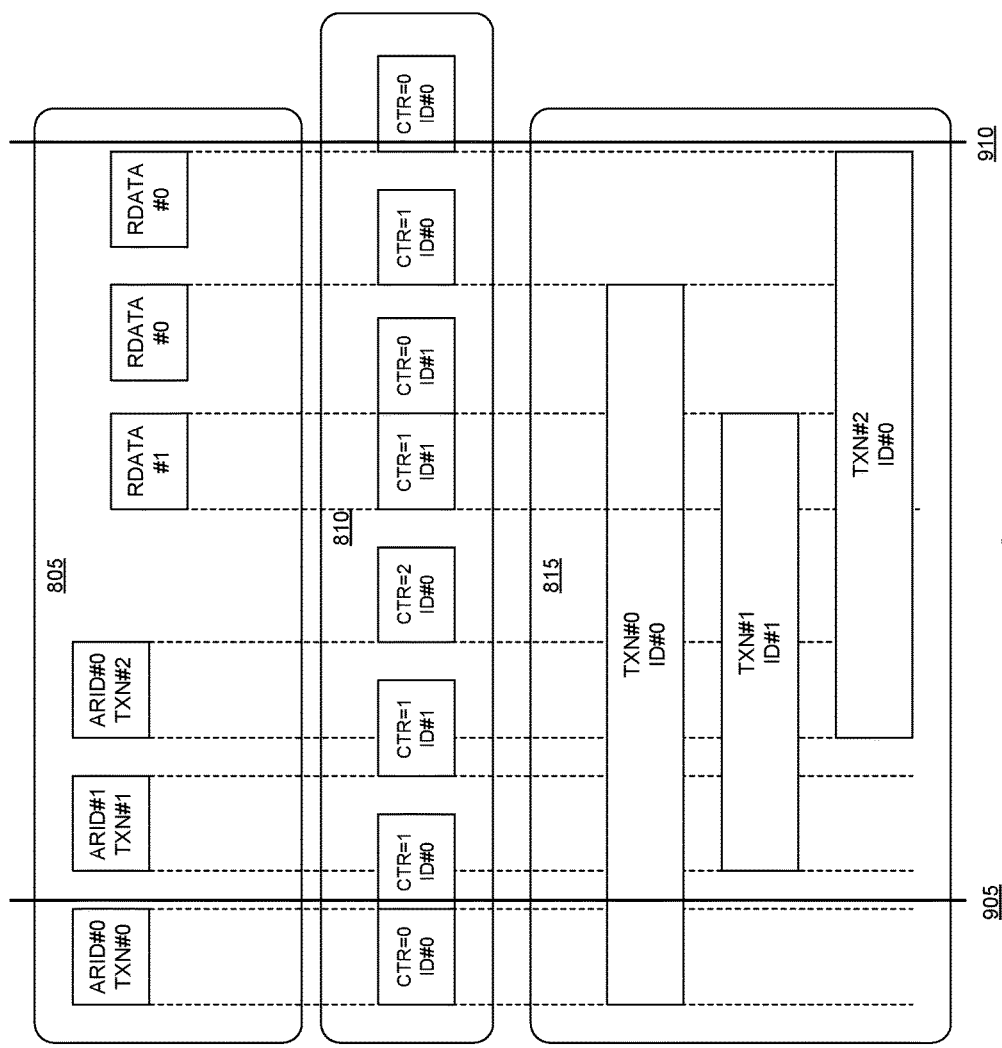
FIG. 11 illustrates another example of extracting transaction level information for read transactions occurring over an interface.

FIG. 11 illustrates another example of extracting transaction level information for read transactions occurring over an interface. FIG. 11 illustrates an example of generating counter data in the case of read transactions that have different transaction IDs. In the case where transactions have different transaction IDs, the transactions can complete in any order. As such, transactions may complete in a different order than issued.

Referring to region 805, each block labeled "ARID" indicates the occurrence and detection of an ARVALID-ARREADY signal handshake corresponding to the start of a read transaction. The transaction ID is specified following the "#" sign for each ARVALID-ARREADY signal handshake. In the example of FIG. 11, three read transactions are detected with transaction IDs 0 (for TXN#0), followed by 1 (for TXN#1), followed by 0 (for TXN#2).

In this example, two read counters are used since there are two different transaction IDs used. Region 810 illustrates how the counter is incremented and decremented in response to the various states detected from the control signals. As pictured, the counter for transaction ID 0 (ID#0) and the counter for transaction ID 1 (ID#1) are both initially 0. In the clock cycle following "ARID#0 TXN#0", the counter for transaction ID 0 is incremented by one to a value of 1. In the clock cycle following "ARID#1 TXN#1", the counter for transaction ID 1 is incremented by one to a value of 1. In the clock cycle following "ARID#0 TXN#2", the counter for transaction ID 0 is incremented by one to a value of 2.

Referring again to region 805, each block labeled "RDATA" indicates the occurrence and detection of an RVALID-RREADY-RLAST signal handshake corresponding to the end of a read transaction. Referring to region 810, the appropriate counter is decremented in response to each "RDATA" block. In the clock cycle following "RDATA#1", the counter for transaction ID 1 is decremented by one to a value of 0. In the clock cycle following "RDATA#0", the counter for transaction ID 0 is decremented by one to a value of 1. In the clock cycle following "RDATA#0", the counter for transaction ID 0 is decremented by one to a value of 0. Upon each counter reaching a value of 0, the counters are de-allocated and marked as "available".

The interface tracking circuit is capable of outputting the counter values on a per clock cycle basis to the ILA. The interface tracking circuit is capable of outputting the counter values in synchronization with the signal data received by the ILA from the interface. The ILA is capable of storing the counter values over time, including for times prior to the start of a trace window, throughout the trace window, and continuing beyond the trace window.

Referring to region 815, the host system is capable of correlating the signals of the trace data received from the ILA with the counter data also received from the ILA. The host system is capable of matching the read address commands and read data beats (e.g., responses), for example, with corresponding counter values (in time) to determine the beginning and end of particular read transactions.

In the example of FIG. 11, the host system generates a visualization of the transaction data in which a waveform view or a block is shown for each of transactions TXN#0, TXN#1, and TXN#2 on a timeline where the start of each transaction is determined based upon the ARID signal handshakes and the end of each transaction is determined from the RDATA signal handshakes described. In one or more embodiments, the timeline corresponds to the start and end time of the trace window.

In the example of FIG. 11, line 905 marks the start of the trace window. Line 910 marks the end of the trace window. In processing the trace data and counter data, the host is capable of first initializing the read transaction counters to zero. In response to detecting the "ARID#1 TXN#1" start event, for example, the host pushes the detected start event onto the read ID queue for ID=1 at index 0. The host further increments the host (read) transaction counter for ID=1 to 1.

The host next detects the "ARID#0 TXN#2" start event. In response to detecting the "ARID#0 TXN#2" start event, the host pushes the start event onto the write ID queue for ID=0 at index 0. Further, the host increments the host (read) transaction counter for ID=0 to 1.

Next the host is capable of detecting the "RDATA #1" end event. The host finds the corresponding read ID queue for ID=1 and performs the following operations for determining whether the end event is for a valid transaction. The host calculates the query index. In this example, the query index is the value of the host (read) transaction counter for ID=1 minus the value of the hardware counter (CTR) from the programmable IC at the same time within the trace data for the same ID. In this example, the host (read) transaction counter for ID=1 is 1 and the counter value (CTR) for ID=1 is also 1. Accordingly, the queue index is 0. Since the queue index is non-negative, the queue index is valid. Further, the host is capable of determining that the end event does match an entry (e.g., start event) within the read ID queue for ID=1. Because the end event is for a valid read transaction, the host adds the end event information for the "RDATA #1" end event to the entry of the matching start event in the read ID queue for ID=1 at index 0.

Next the host is capable of detecting the "RDATA #0" end event. The host finds the corresponding write ID queue for ID=0 and performs the following operations for determining whether the end event is for a valid transaction. The host calculates the query index. In this example, the query index is the value of the host (read) transaction counter for ID=0 minus the value of the hardware counter (CTR) from the programmable IC at the same time within the trace data for the same ID. In this example, the host (read) transaction counter for ID=0 is 1 and the counter value for ID=0 (CTR) is 2. Accordingly, the queue index is −1. Since the queue index is negative, the queue index is invalid. Further, the host is capable of determining that the end event does not match an entry (e.g., start event) within the read ID queue for ID=0. Because the end event is not for a valid read transaction, the host discards the end event as corresponding to a start event that occurred prior to the start of the trace window.

Next the host is capable of detecting the second "RDATA #0" end event. The host finds the corresponding write ID queue for ID=0 and performs the following operations for determining whether the end event is for a valid read transaction. The host calculates the query index. In this example, the query index is the value of the host (read) transaction counter for ID=0 minus the value of the hardware counter (CTR) from the programmable IC at the same time within the trace data for the same ID. In this example, the host (read) transaction counter for ID=0 is 1 and the counter value (CTR) for ID=1 is 1. Accordingly, the queue index is 0. Since the queue index is non-negative, the queue index is valid. Further, the host is capable of determining that the end event does match an entry (e.g., start event) within the read ID queue for ID=0. Because the end event is for a valid read transaction, the host adds the end event to the queue entry (corresponding to the matching start event) at index 0.

In response to finishing processing of the transactions, the host is capable of generating the view illustrated in region 815.

Figure 12:
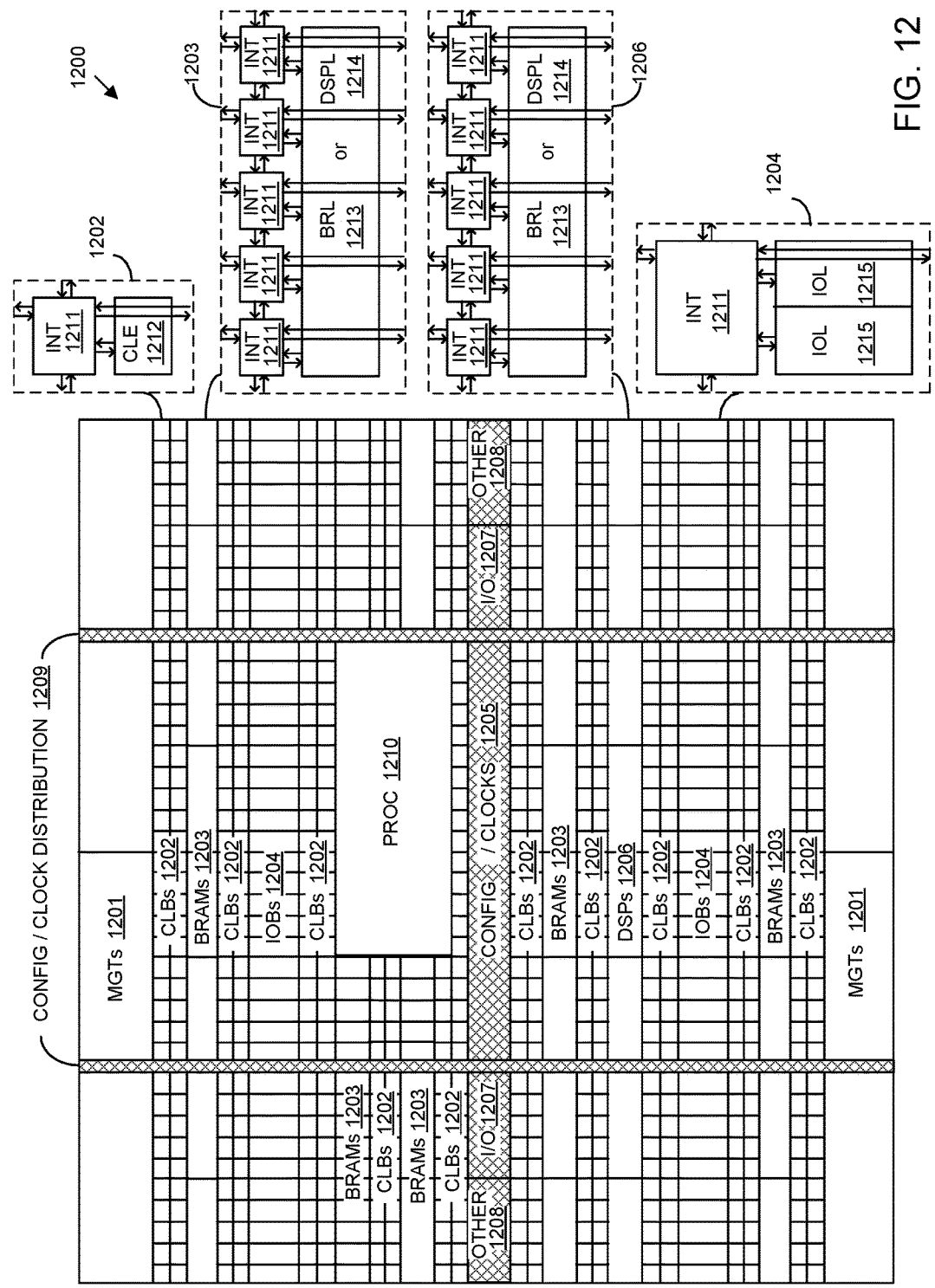
FIG. 12 illustrates an example architecture for an integrated circuit.

FIG. 12 illustrates an example architecture 1200 for an IC. In one aspect, architecture 1200 may be implemented within a programmable IC. For example, architecture 1200 may be used to implement a field programmable gate array (FPGA). Architecture 1200 may also be representative of a system-on-chip (SOC) type of IC. An SOC is an IC that includes a processor that executes program code and one or more other circuits. The other circuits may be implemented as hard-wired circuitry, programmable circuitry, and/or a combination thereof. The circuits may operate cooperatively with one another and/or with the processor.

As shown, architecture 1200 includes several different types of programmable circuit, e.g., logic, blocks. For example, architecture 1200 may include a large number of different programmable tiles including multi-gigabit transceivers (MGTs) 1201, configurable logic blocks (CLBs) 1202, random access memory blocks (BRAMs) 1203, input/output blocks (IOBs) 1204, configuration and clocking logic (CONFIG/CLOCKS) 1205, digital signal processing blocks (DSPs) 1206, specialized I/O blocks 1207 (e.g., configuration ports and clock ports), and other programmable logic 1208 such as digital clock managers, analog-to-digital converters, system monitoring logic, and so forth.

In one or more embodiments, each CLB 1202 includes one or more LUTs. LUTs from CLBs 1202 may be used to implement a variety of different circuit structures as described herein. For example, LUTs from CLBs 1202 may be used to implement memory 403 (e.g., each of write memory 412 and read memory 414). In addition, LUTs included in CLBs 1202 may be used to implement write counter circuitry 401 (e.g., each of write counter circuit 404 and read counter circuit 406) and write mapper circuitry 402 (e.g., each of write mapper circuit 408 and read mapper circuit 410).

In some ICs, each programmable tile includes a programmable interconnect element (INT) 1211 having standardized connections to and from a corresponding INT 1211 in each adjacent tile. Therefore, INTs 1211, taken together, implement the programmable interconnect structure for the illustrated IC. Each INT 1211 also includes the connections to and from the programmable logic element within the same tile, as shown by the examples included at the top of FIG. 12.

For example, a CLB 1202 may include a configurable logic element (CLE) 1212 that may be programmed to implement user logic plus a single INT 1211. A BRAM 1203 may include a BRAM logic element (BRL) 1213 in addition to one or more INTs 1211. Typically, the number of INTs 1211 included in a tile depends on the height of the tile. As pictured, a BRAM tile has the same height as five CLBs, but other numbers (e.g., four) also may be used. A DSP tile 1206 may include a DSP logic element (DSPL) 1214 in addition to an appropriate number of INTs 1211. An 10B 1204 may include, for example, two instances of an I/O logic element (IOL) 1215 in addition to one instance of an INT 1211. The actual I/O pads connected to IOL 1215 may not be confined to the area of IOL 1215.

In the example pictured in FIG. 12, a columnar area near the center of the die, e.g., formed of regions 1205, 1207, and 1208, may be used for configuration, clock, and other control logic. Horizontal areas 1209 extending from this column may be used to distribute the clocks and configuration signals across the breadth of the programmable IC.

Some ICs utilizing the architecture illustrated in FIG. 12 include additional logic blocks that disrupt the regular columnar structure making up a large part of the IC. The additional logic blocks may be programmable blocks and/or dedicated circuitry. For example, a processor block depicted as PROC 1210 spans several columns of CLBs and BRAMs.

In one aspect, PROC 1210 may be implemented as dedicated circuitry, e.g., as a hardwired processor, that is fabricated as part of the die that implements the programmable circuitry of the IC. PROC 1210 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 1210 may be omitted from architecture 1200 and replaced with one or more of the other varieties of the programmable blocks described. Further, such blocks may be utilized to form a "soft processor" in that the various blocks of programmable circuitry may be used to form a processor that can execute program code as is the case with PROC 1210.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 12 that are external to PROC 1210 such as CLBs 1202 and BRAMs 1203 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. For example, the configuration bitstream may specify a user circuit design having an integrated interface monitoring circuitry as described herein that is physically implemented in an IC when the configuration bitstream is loaded into configuration memory of the IC. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 1210.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SOC, the configuration bitstream may specify the circuitry that is to be implemented within the programmable circuitry and the program code that is to be executed by PROC 1210 or a soft processor. In some cases, architecture 1200 includes a dedicated configuration processor that loads the configuration bitstream to the appropriate configuration memory and/or processor memory. The dedicated configuration processor does not execute user-specified program code. In other cases, architecture 1200 may utilize PROC 1210 to receive the configuration bitstream, load the configuration bitstream into appropriate configuration memory, and/or extract program code for execution.

FIG. 12 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 12 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 1210 within the IC are for purposes of illustration only and are not intended as limitations.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," "one or more embodiments," "particular embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," "in particular embodiments," and similar language throughout this disclosure may, but do not necessarily, all refer to the same embodiment. The terms "embodiment" and "arrangement" are used interchangeably within this disclosure.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), an FPGA, a programmable logic array (PLA), an ASIC, programmable logic circuitry, and a controller.

As defined herein, the term "output" means storing in physical memory elements, e.g., devices, writing to display or other peripheral output device, sending or transmitting to another system, exporting, or the like.

As defined herein, the term "real time" means a level of processing responsiveness that a user or system senses as sufficiently immediate for a particular process or determination to be made, or that enables the processor to keep up with some external process.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

One or more embodiments are directed to methods for extracting transaction level information from an interface. In one aspect, a method can include tracking transactions of an interface within an IC using a plurality of counters within the IC, wherein the counters generate counter data corresponding to the transactions. The method can include capturing signals of the interface as trace data for a trace window using an integrated logic analyzer within the IC, wherein a start of the trace window begins after a start of the tracking of the transactions using the plurality of counters. The method can also include, using a host data processing system coupled to the IC, determining transaction level information for the interface using the counter data and the trace data for the trace window.

In an aspect, tracking the transactions includes, in response to detecting a start of a transaction having a selected transaction identifier, determining whether a counter of the plurality of counters is allocated to the selected transaction identifier. In another aspect, the method includes, in response to determining that a counter is not allocated to the selected transaction identifier, allocating an available counter of the plurality of counters to the selected transaction identifier.

In another aspect, tracking the transactions includes, in response to detecting a start of a transaction, incrementing a counter of the plurality of counters allocated to a transaction identifier for the transaction and, in response to detecting an end of the transaction, decrementing the counter of the plurality of counter allocated to the transaction identifier for the transaction.

In another aspect, the method can include, in response to the counter of the plurality of counters being decremented to zero, designating the counter as available.

In another aspect, determining the transaction level information for the interface includes matching ends of the transactions occurring during the trace window with corresponding starts of the transactions based upon a number of outstanding transactions at the start of the trace window specified by the counter data.

In another aspect, matching includes determining that an end of a selected transaction occurring during the trace window corresponds to a start of the selected transaction occurring prior the start of the trace window.

In another aspect, the method includes displaying a graphical representation of the transaction information specifying a start time and an end time for transactions on a timeline corresponding to the trace window.

One or more embodiments are directed to systems for extracting transaction level information from an interface within an integrated circuit (IC). The system can include an interface tracking circuit implemented within the IC. The interface tracking circuit can include a memory configured to store counter values indicating outstanding transactions of the interface, a mapper circuit configured to read and write counter values to addresses in the memory based upon transaction identifiers of the transactions, and a counter circuit configured to increment or decrement the counter values retrieved from the memory by the mapper circuit in response to detected starts and ends of the transactions. The system can also include an integrated logic analyzer configured to store signal data from the interface for the transactions as trace data and store the counter values, wherein the trace data is for a trace window having a start occurring subsequent to a start of operation of the interface tracking circuit.

In another aspect, the memory includes a write memory configured to store a write counter value indicating outstanding write transactions and a read memory configured to store a read counter value indicating outstanding read transactions.

In another aspect, the mapper circuit includes a write mapper circuit configured to read and write the write counter values to an address in the write memory based upon the transaction identifier of the write transactions and a read mapper circuit configured to read and write the read counter values to an address in the read memory based upon the transaction identifier of the read transactions.

In another aspect, the write mapper circuit is configured to manage allocation of addresses in the write memory to transaction identifiers of write transactions. The read mapper circuit is configured to manage allocation of addresses in the read memory to transaction identifiers of read transactions.

In another aspect, in response to a selected write counter value being decremented to zero, the write mapper circuit is configured to designate the address of the selected write counter value as available. In response to a selected read counter value being decremented to zero, the read mapper circuit is configured to designate the address of the selected read counter value as available.

In another aspect, the counter circuit includes a write counter circuit configured to increment or decrement write counter values retrieved from the write memory by the write mapper circuit in response to detected starts and ends of write transactions and a read counter circuit configured to increment or decrement read counter values retrieved from the read memory by the read mapper circuit in response to detected starts and ends of read transactions.

In another aspect, the write counter circuit is configured increment a selected write counter value allocated to a selected transaction identifier in response to each detected start of a write transaction with the selected transaction identifier and decrement the selected write counter value allocated to the selected transaction identifier in response to each detected end of a write transaction with the selected transaction identifier.

In another aspect, the read counter circuit is configured to increment a selected read counter value allocated to a selected transaction identifier in response to each detected start of a read transaction with the selected transaction identifier and decrement the selected read counter value allocated to the selected transaction identifier in response to each detected end of a read transaction with the selected transaction identifier.

In another aspect, the system can include a host data processing system configured to determine transaction information for the interface using the trace data and the outstanding transactions of the interface.

In another aspect, the host system is configured to determine transaction information by matching ends of the transactions occurring during the trace window with corresponding starts of the transactions based upon the outstanding transactions of the interface at the start of the trace window.

In another aspect, the matching includes determining that an end of a selected write transaction occurring during the trace window corresponds to a start of the selected write transaction occurring prior the start of the trace window or determining that an end of a selected read transaction occurring during the trace window corresponds to a start of the selected read transaction occurring prior the start of the trace window.

In another aspect, the host data processing system is configured to display a graphical representation of the transaction information specifying a start time and an end time for transactions on a timeline corresponding to the trace window.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method for extracting transaction level information from an interface, the method comprising:
    tracking transactions of an interface within an integrated circuit using a plurality of counters within the integrated circuit, wherein the counters generate counter data corresponding to the transactions;
    capturing signals of the interface as trace data for a trace window using an integrated logic analyzer within the integrated circuit, wherein a start of the trace window begins after a start of the tracking of the transactions using the plurality of counters; and
    using a host data processing system coupled to the integrated circuit, determining transaction level information for the interface using the counter data and the trace data for the trace window.

2. The method of claim 1, wherein the tracking the transactions comprises:
    in response to detecting a start of a transaction having a selected transaction identifier, determining whether a counter of the plurality of counters is allocated to the selected transaction identifier.

3. The method of claim 2, further comprising:
    in response to determining that a counter is not allocated to the selected transaction identifier, allocating an available counter of the plurality of counters to the selected transaction identifier.

4. The method of claim 1, wherein the tracking the transactions comprises:
    in response to detecting a start of a transaction, incrementing a counter of the plurality of counters allocated to a transaction identifier for the transaction; and
    in response to detecting an end of the transaction, decrementing the counter of the plurality of counter allocated to the transaction identifier for the transaction.

5. The method of claim 4, further comprising:
    in response to the counter of the plurality of counters being decremented to zero, designating the counter as available.

6. The method of claim 1, wherein the determining the transaction level information for the interface comprises:
    matching ends of the transactions occurring during the trace window with corresponding starts of the transactions based upon many outstanding transactions at the start of the trace window specified by the counter data.

7. The method of claim 6, wherein the matching comprises:
    determining that an end of a selected transaction occurring during the trace window corresponds to a start of the selected transaction occurring prior the start of the trace window.

8. The method of claim 7, further comprising:
    displaying a graphical representation of the transaction information specifying a start time and an end time for transactions on a timeline corresponding to the trace window.

9. A system for extracting transaction level information from an interface within an integrated circuit, the system comprising:
    an interface tracking circuit implemented within the integrated circuit, wherein the interface tracking circuit includes:
        a memory configured to store counter values indicating transactions of the interface that are outstanding;
        a mapper circuit configured to read and write counter values to addresses in the memory based upon transaction identifiers of the transactions;
        a counter circuit configured to increment or decrement the counter values retrieved from the memory by the mapper circuit in response to detected starts and ends of the transactions; and
    an integrated logic analyzer configured to store signal data from the interface for the transactions as trace data and store the counter values, wherein the trace data is for a trace window having a start occurring subsequent to a start of operation of the interface tracking circuit.

10. The system of claim 9, wherein the memory comprises:
a write memory configured to store a write counter value indicating write transactions that are outstanding; and
a read memory configured to store a read counter value indicating read transactions that are outstanding.

11. The system of claim 10, wherein the mapper circuit comprises: a write mapper circuit configured to read and write the write counter values to an address in the write memory based upon a transaction identifier of the write transactions; and a read mapper circuit configured to read and write the read counter values to an address in the read memory based upon a transaction identifier of the read transactions.

12. The system of claim 11, wherein:
the write mapper circuit is configured to manage allocation of addresses in the write memory to transaction identifiers of the write transactions; and
the read mapper circuit is configured to manage allocation of addresses in the read memory to transaction identifiers of the read transactions.

13. The system of claim 12, wherein: in response to a selected write counter value being decremented to zero, the write mapper circuit is configured to designate an address of the selected write counter value as available; and in response to a selected read counter value being decremented to zero, the read mapper circuit is configured to designate an address of the selected read counter value as available.

14. The system of claim 11, wherein the counter circuit comprises:
a write counter circuit configured to increment or decrement write counter values retrieved from the write memory by the write mapper circuit in response to detected starts and ends of write transactions; and
a read counter circuit configured to increment or decrement read counter values retrieved from the read memory by the read mapper circuit in response to detected starts and ends of read transactions.

15. The system of claim 14, wherein the write counter circuit is configured to:
increment a selected write counter value allocated to a selected transaction identifier in response to each detected start of a write transaction with the selected transaction identifier; and
decrement the selected write counter value allocated to the selected transaction identifier in response to each detected end of a write transaction with the selected transaction identifier.

16. The system of claim 14, wherein the read counter circuit is configured to:
increment a selected read counter value allocated to a selected transaction identifier in response to each detected start of a read transaction with the selected transaction identifier; and
decrement the selected read counter value allocated to the selected transaction identifier in response to each detected end of a read transaction with the selected transaction identifier.

17. The system of claim 9, further comprising:
a host data processing system configured to determine transaction information for the interface using the trace data and the outstanding transactions of the interface.

18. The system of claim 17, wherein the host system is configured to determine transaction information by matching ends of selected transactions occurring during the trace window with corresponding starts of the selected transactions based upon the transactions of the interface that are outstanding at the start of the trace window.

19. The system of claim 18, wherein the matching includes: determining that an end of a selected write transaction occurring during the trace window corresponds to a start of the selected write transaction occurring prior the start of the trace window; or determining that an end of a selected read transaction occurring during the trace window corresponds to a start of the selected read transaction occurring prior to the start of the trace window.

20. The system of claim 17, wherein the host data processing system is configured to display a graphical representation of the transaction information specifying a start time and an end time for transactions on a timeline corresponding to the trace window.

* * * * *